United States Patent
Ito et al.

(10) Patent No.: US 11,441,635 B2
(45) Date of Patent: Sep. 13, 2022

(54) LIQUID FILLED BUSHING ASSEMBLY

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 204 days.

(21) Appl. No.: 16/790,258

(22) Filed: Feb. 13, 2020

(65) Prior Publication Data

US 2020/0263755 A1 Aug. 20, 2020

(30) Foreign Application Priority Data

Feb. 15, 2019 (JP) .............................. JP2019-025091

(51) Int. Cl.
*F16F 13/10* (2006.01)
*F16F 13/30* (2006.01)
*F16F 13/28* (2006.01)

(52) U.S. Cl.
CPC ............ *F16F 13/107* (2013.01); *F16F 13/28* (2013.01); *F16F 13/305* (2013.01);
(Continued)

(58) Field of Classification Search
CPC ...... F16F 13/264; F16F 13/262; F16F 13/266; F16F 13/28; F16F 13/305; F16F 13/30; F16F 7/1011; F16F 7/1017; F16F 15/03; F16F 15/035; F16F 13/268; F16F 15/005; F16F 6/005; F16F 13/10; F16F 9/532; F16F 13/08; F16F 2230/183; F16F 2222/06; F16F 2224/045; F16F 1/361; F16F 1/38; F16F 2228/063; F16F 13/06; F16F 9/53;
(Continued)

(56) References Cited

U.S. PATENT DOCUMENTS

| | | | |
|---|---|---|---|
| 4,840,359 A * | 6/1989 | Hamaekers | F16F 13/14 267/140.12 |
| 4,971,456 A * | 11/1990 | Hori | B60K 17/24 267/140.12 |

(Continued)

FOREIGN PATENT DOCUMENTS

| | | |
|---|---|---|
| CN | 205278223 U | 6/2016 |
| CN | 105909722 A | 8/2016 |

(Continued)

OTHER PUBLICATIONS

First Notification of Office Action for Application No. CN 202010090112.6 dated Jun. 3, 2021; 22 pp.

*Primary Examiner* — Robert A. Siconolfi
*Assistant Examiner* — Mahbubur Rashid
(74) *Attorney, Agent, or Firm* — Armstrong Teasdale LLP

(57) ABSTRACT

A liquid filled bushing assembly includes an inner tubular member (11), an outer tubular member (12) disposed in a coaxial relation to the inner tubular member, and an elastic member (13) interposed between the inner tubular member and the outer tubular member, wherein not only the stiffness of the liquid filled bushing assembly in the lateral directions can be freely selected but also the stiffness of the liquid filled bushing assembly in the rotational direction and/or the axial direction can be freely selected.

7 Claims, 10 Drawing Sheets

(52) U.S. Cl.
CPC ............... *B60G 2204/41062* (2013.01); *F16F 2222/06* (2013.01); *F16F 2224/045* (2013.01); *F16F 2228/066* (2013.01)

(58) Field of Classification Search
CPC ........ F16F 13/149; F16F 15/0275; F16F 7/10; F16F 13/102; F16F 13/1418; F16F 13/1427; F16F 13/1481; F16F 15/04; F16F 2224/043; F16F 2228/066; F16F 9/05
See application file for complete search history.

(56) References Cited

U.S. PATENT DOCUMENTS

| | | | | |
|---|---|---|---|---|
| 5,013,012 A | * | 5/1991 | Jouade | F16F 13/1463 267/140.12 |
| 5,024,425 A | * | 6/1991 | Schwerdt | F16F 13/1481 267/140.12 |
| 5,123,634 A | * | 6/1992 | Schwerdt | F16F 13/1481 267/140.12 |
| 5,139,241 A | * | 8/1992 | Hamaekers | F16F 13/1463 267/140.11 |
| 5,165,668 A | * | 11/1992 | Gennesseaux | F16F 13/28 267/140.12 |
| 5,547,172 A | * | 8/1996 | Corcoran | F16F 13/16 267/140.13 |
| 5,609,353 A | * | 3/1997 | Watson | B60G 17/015 188/267 |
| 5,974,856 A | * | 11/1999 | Elie | B60G 7/02 267/140.14 |
| 6,443,438 B2 | * | 9/2002 | Satori | F16F 13/105 267/140.13 |
| 6,585,222 B2 | * | 7/2003 | Ihara | F16F 1/3873 248/308 |
| 6,663,090 B2 | * | 12/2003 | Simuttis | F16F 13/262 267/140.13 |
| 6,820,867 B2 | * | 11/2004 | Satori | F16F 13/108 267/140.13 |
| 7,070,027 B2 | * | 7/2006 | Manecke | F16F 9/535 188/267 |
| 8,167,286 B2 | * | 5/2012 | Hirano | F16F 1/38 267/293 |
| 8,231,116 B2 | * | 7/2012 | Nishi | F16F 13/10 267/140.13 |
| 9,200,694 B2 | * | 12/2015 | Kojima | F16F 13/108 |

FOREIGN PATENT DOCUMENTS

| | | | | |
|---|---|---|---|---|
| DE | 3804123 A1 | * | 8/1989 | ............ F16F 13/14 |
| EP | 1705400 A | | 9/2006 | |
| EP | 1705400 A1 | * | 9/2006 | ........... F16F 13/305 |
| JP | H07158688 A | | 6/1995 | |
| JP | H07280024 A | | 10/1995 | |
| JP | 2002310219 A | | 10/2002 | |
| JP | 2007170451 A | | 7/2007 | |

* cited by examiner

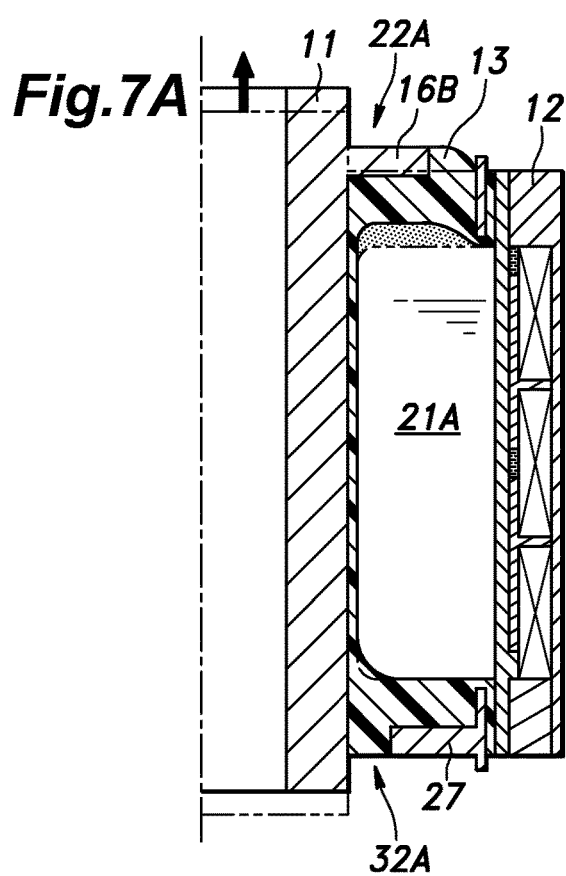
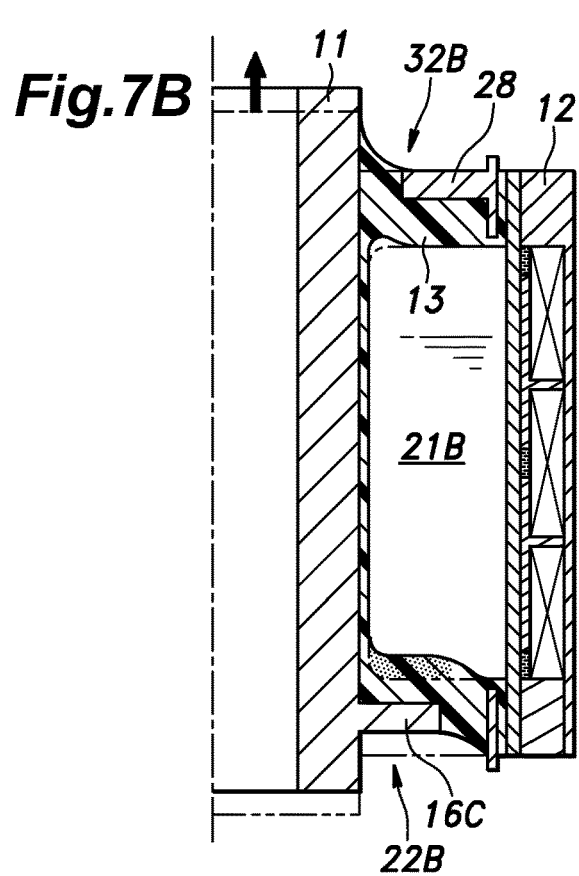
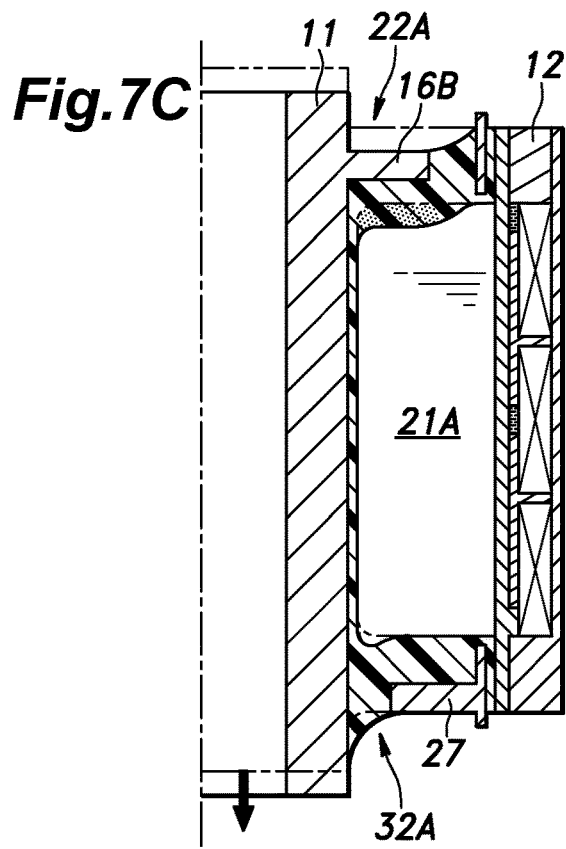
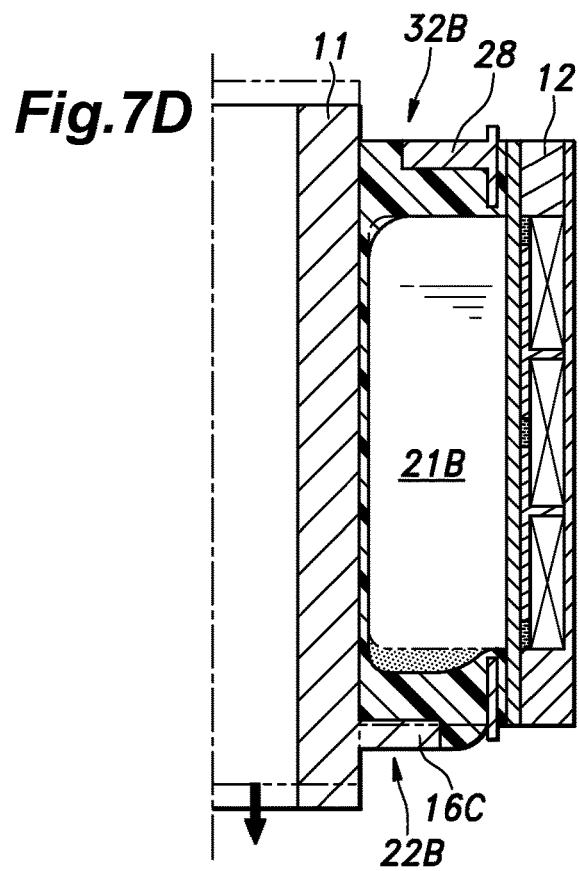

LIQUID FILLED BUSHING ASSEMBLY

TECHNICAL FIELD

The present disclosure relates to a liquid filled bushing assembly configured to be interposed between a vibration source and a support member that supports the vibration source, and more particularly to a liquid filled bushing assembly that can change the stiffness thereof.

BACKGROUND ART

A conventional liquid filled bushing assembly includes an inner tubular member, an outer tubular member coaxially disposed to the inner tubular member, and a plurality of elastic partition wall members that extend radially between the inner tubular member and the outer tubular member to define a plurality of liquid chambers that are communicated with one another via orifice passages. The liquid chambers and the orifice passages are filled with liquid. See JP2002-310219A, for instance. According to this prior art, the liquid filled bushing assembly is provided with three pairs of liquid chambers that are arranged circumferentially at a regular interval, and each diametrically opposing pairs of liquid chambers are communicated with each other via an orifice passage.

When the liquid filled bushing is subjected to a vibration which is directed along one of the mutually opposing pair of liquid chambers, the damping force against the vibration is created due to the movement of the liquid between the two liquid chambers. The damping action may be properly tuned to the targeted frequency by suitably configuring the corresponding orifice passage and selecting various other parameters. Owing to the presence of the three pairs of liquid chambers, this particular liquid filled bushing can be tuned to dampen vibrations of three different frequencies.

There often are cases where the liquid filled bushing assembly is required to be able to dampen vibrations not only in the radial directions but also in the axial direction and in the rotational direction. It is thus desired that the liquid filled bushing assembly is able to dampen vibrations in desired directions, and the stiffness of the liquid filled bushing assembly to be varied or selected in various directions according to each particular need.

SUMMARY OF THE INVENTION

In view of such a problem of the prior art, a primary object of the present invention is to provide a liquid filled bushing assembly including an inner tubular member, an outer tubular member disposed in a coaxial relation to the inner tubular member, and an elastic member interposed between the inner tubular member and the outer tubular member, wherein not only the stiffness of the liquid filled bushing assembly in the lateral directions can be freely selected but also the stiffness of the liquid filled bushing assembly in the rotational direction and/or the axial direction can be freely selected.

To achieve such an object, the present invention provides a liquid filled bushing assembly (1), comprising: an inner tubular member (11) having a central axial line (X); an outer tubular member (12) surrounding the inner tubular member in a coaxial relationship with an annular space defined therebetween; and a tubular elastic member (13) interposed and connected between the inner tubular member and the outer tubular member and defining a first to a fourth liquid chamber (21) arranged in a circumferential direction at a regular interval in that order, the tubular elastic member defining a first communication passage (42A) communicating the first liquid chamber (21A) with the third liquid chamber (21C), a second communication passage (42B) communicating the second liquid chamber (21B) with the fourth liquid chamber (21D), a third communication passage (42C) communicating the first liquid chamber (21A) with the second liquid chamber (21B), and a fourth communication passage (42D) communicating the third liquid chamber (21C) with the fourth liquid chamber (21D); wherein the first liquid chamber, the second liquid chamber, the third liquid chamber, the fourth liquid chamber, the first communication passage, the second communication passage, the third communication passage, and the fourth communication passage are filled with viscous fluid (70), wherein the liquid chambers are configured such that cubic capacities of the first and second liquid chambers change in a mutually complementary manner, and cubic capacities of the third and fourth liquid chambers change in a mutually complementary manner when the inner tubular member is moved relative to the outer tubular member along the central axial line, the cubic capacities of the first and second liquid chambers change in a mutually complementary manner, and the cubic capacities of the third and fourth liquid chambers change in a mutually complementary manner when the inner tubular member is rotated relative to the outer tubular member around the central axial line, the cubic capacities of the first and third liquid chambers change in a mutually complementary manner when the inner tubular member is moved relative to the outer tubular member in a direction along which the first and third liquid chambers are arranged, and the cubic capacities of the second and fourth liquid chambers change in a mutually complementary manner when the inner tubular member is moved relative to the outer tubular member in a direction along which the second and fourth liquid chambers are arranged.

According to this configuration, when a load is applied to the inner tubular member relative to the outer tubular member in the direction along which the first liquid chamber and the third liquid chamber are arranged, the viscous fluid flowing through the first communication passage communicating the first and third liquid chambers with each other encounters a certain flow resistance. When a load is applied to the inner tubular member relative to the outer tubular member in the direction along which the second liquid chamber and the fourth liquid chamber are arranged, the viscous fluid flowing through the second communication passage communicating the second liquid chamber and the fourth liquid chamber with each other encounters a certain flow resistance. Therefore, by changing the cross sectional area and length of the first communication passage and the second communication passage, the stiffness of the liquid filled bushing assembly in two directions (the direction along which the first liquid chamber and the third liquid chamber are arranged and the direction along which the second and fourth liquid chamber are arranged) orthogonal to the axial line can be changed.

Further, when a load is applied to the inner tubular member relative to the outer tubular member in a direction parallel to the axial line or in a direction to rotate the inner tubular member relative to the outer tubular member around the axial line, the viscous fluid flowing through the third communication passage communicating the first liquid chamber and the second liquid chamber with each other encounters a certain flow resistance, and also, the viscous fluid flowing through the fourth communication passage communicating the third liquid chamber and the fourth liquid chamber with each other encounters a certain flow resistance. Therefore, by changing the cross sectional area and length of the third communication passage and the fourth communication passage, the stiffness of the liquid filled bushing assembly in two directions (the direction in parallel with the axial line and the direction to rotate the inner tubular member) can be changed.

Preferably, the elastic member is provided with a first to a fourth radial wall (18) extending in a radial direction with respect to the central axial line and arranged around the central axial line in that order, four first end wall parts (19) attached to corresponding first axial ends of the radial walls, and four second end wall parts (20) attached to corresponding second axial ends of the radial walls in such a manner that the first to fourth liquid chambers are defined by the first to fourth radial walls, the four first end wall parts and the four second end wall parts.

Thereby, the four liquid chambers arranged in the circumferential direction can be formed in the elastic member by using a simple structure.

Preferably, a high bending stiffness portion (22A, 22B) is provided in radially inner parts of the first end wall part defining a first axial end of the first liquid chamber and the second end wall part defining a second axial end of the second liquid chamber, and another high bending stiffness portion (32A, 32B) is provided in radially outer parts of the second end wall part defining a second axial end of the first liquid chamber and the first end wall part defining a first axial end of the second liquid chamber.

Thereby, when the inner tubular member is moved relative to the outer tubular member in the upward direction, the cubic capacity of the first liquid chamber can be increased while the cubic capacity of the second liquid chamber is decreased. Conversely, when the inner tubular member is moved relative to the outer tubular member in the downward direction, the cubic capacity of the first liquid chamber can be decreased while the cubic capacity of the second liquid chamber is increased. Thus, the cubic capacities of the first liquid chamber and the second liquid chamber can be changed in a mutually complementary manner in response to the vertical movement of the inner tubular member relative to the outer tubular member.

The high bending stiffness portion may include a reinforcing plate (16B, 16C, 27, 28) provided in each of the corresponding end wall parts so that the high bending stiffness portion may be formed by using a simple structure.

Preferably, a high bending stiffness portion (22C) is provided in radially inner parts of the first radial wall and the third radial wall, and another high bending stiffness portion (32C) is provided in radially outer parts of the second radial wall and the fourth radial wall.

Thereby, when the inner tubular member is rotated relative to the outer tubular member, the cubic capacities of one of the diagonally opposing pairs of the liquid chambers increase while the cubic capacities of the other of the diagonally opposing pairs of the liquid chambers decrease. In other words, the cubic capacities of one of the diagonally opposing pairs of the liquid chambers change relative to the cubic capacities of one of the diagonally opposing pairs of the liquid chambers in a mutually complementary manner.

The high bending stiffness portion may include a reinforcing plate (16A, 26E) provided in each of the corresponding radial walls.

Preferably, the outer tubular member includes a coil (40) disposed in a coaxial relationship to the inner tubular member, and a yoke (45, 47) having an axial gap (60) located inside the coil, and the viscous fluid consists of a magnetic fluid having a viscosity that increases when subjected to a magnetic field, at least one of the communication passages extending through the axial gap.

The viscosity of the viscous fluid flowing through the communication passages defined in the axial gaps can be increased by energizing the coil. Thereby, the flow resistance to the viscous fluid flowing through the communication passages can be increased so that the stiffness of the liquid filled bushing assembly can be increased as required.

Preferably, the outer tubular member further includes a passage forming member (46) made of material having a low magnetic permeability and enclosing the axial gap from a radially inner side thereof so as to define the at least one of the communication passages extending through the axial gap in cooperation with the coil and the yoke.

Thereby, the communication passages can be formed in a favorable manner without interfering with or disturbing the magnetic circuit formed by the yoke.

Preferably, the coil includes a first coil (40A), a second coil (40B) and a third coil (40C) that are arranged along the central axial line in a mutually spaced apart relationship, and the yoke defines first to third axial gaps serving as magnetic gaps corresponding to the first to third coils, respectively, and wherein the first communication passage passes through the first axial gap (60A), the second communication passage passes through the second axial gap (60B), and the third communication passage passes through the third axial gap (60C).

According to this configuration, by energizing the first coil, the viscosity of the viscous fluid in the first communication passage can be increased. This impedes the movement of the viscous fluid between the first liquid chamber and the third liquid chamber, and increases the resistance to the movement of the inner tubular member in the direction along which the first liquid chamber and the third liquid chamber are arranged. Similarly, by energizing the second coil, the resistance to the movement of the inner tubular member in the direction along which the second liquid chamber and the fourth liquid chamber are arranged can be increased.

Furthermore, by energizing the third coil, the viscosity of the viscous fluid in the third communication passage and the fourth communication passage passing through the third gap can be increased. Thereby, the resistance to the movement of the viscous fluid flowing between the first liquid chamber and the second liquid chamber and the resistance to the movement of the viscous fluid between the third liquid chamber and the fourth liquid chamber are increased. This increases the force required to move the inner tubular member in the direction parallel to the axial line, and increases the force or the torque required to rotate the inner tubular member around the axial line. Thus, by energizing the first, second, and third coils, respectively, the stiffness against the load for moving the inner tubular member with respect to the outer tubular member in the two directions orthogonal to the axial line, the direction parallel to the axial line, and the rotational direction around the axial line can be changed.

The present invention thus provides a liquid filled bushing assembly including an inner tubular member, an outer tubular member disposed in a coaxial relation to the inner tubular member, and an elastic member interposed between the inner tubular member and the outer tubular member, wherein not only the stiffness of the liquid filled bushing assembly in the lateral directions can be freely selected but also the stiffness of the liquid filled bushing assembly in the rotational direction and/or the axial direction can be freely selected.

BRIEF DESCRIPTION OF THE DRAWING(S)

FIG. 7A is a sectional view of the front liquid chamber when the inner tubular member is moving upward relative to the outer tubular member;

FIG. 7B is a sectional view of the right liquid chamber when the inner tubular member is moving upward relative to the outer tubular member;

FIG. 7C is a sectional view of the front liquid chamber when the inner tubular member is moving downward relative to the outer tubular member;

FIG. 7D is a sectional view of the right liquid chamber when the inner tubular member is moving downward relative to the outer tubular member;

BEST MODE FOR CARRYING OUT THE INVENTION

Figure 1:
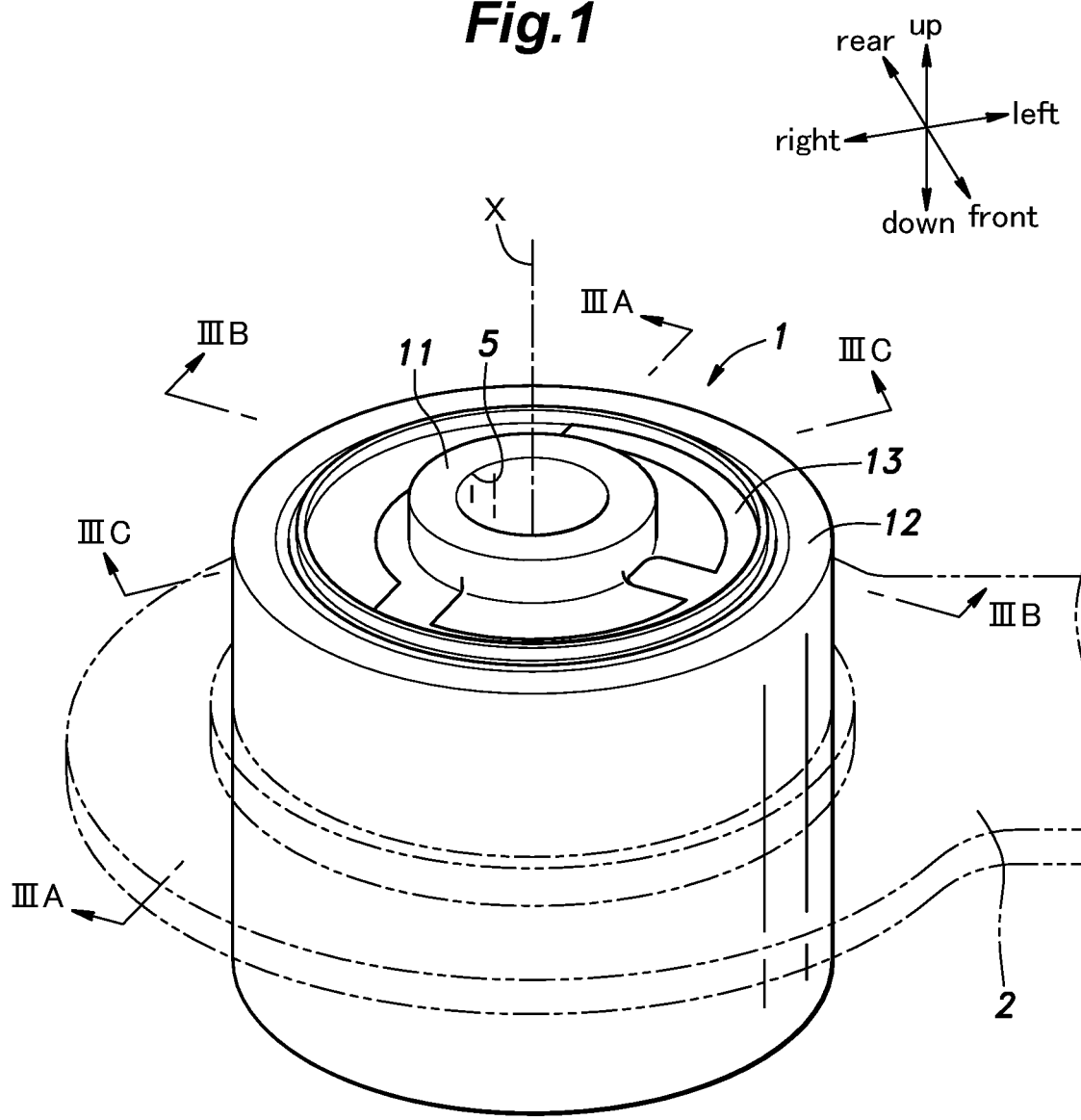
FIG. 1 is a schematic perspective view of a liquid filled bushing assembly according to an embodiment of the present invention as mounted to a lower arm of a wheel suspension device.

A liquid filled bushing assembly 1 according to a first embodiment of the present invention is described in the following with reference to the appended drawings.

The liquid filled bushing assembly 1 according to the embodiment of the present invention is provided, for example, in a lower arm 2 of a double wishbone wheel suspension device for connecting a knuckle (not shown in the drawings) supporting a rear wheel to a vehicle body.

The lower arm 2 is a metal member extending in the lateral direction of the vehicle body, and is connected to the knuckle at the outboard end thereof, and to the vehicle body at the inboard end thereof. As shown in FIG. 1, the inboard end of the lower arm 2 is provided with a through hole passed in the vertical direction, and the liquid filled bushing assembly 1 is fitted into the through hole. The liquid filled bushing assembly 1 has a cylindrical shape, and is attached to the lower arm 2 so that axial line X thereof extends in the vertical direction. The liquid filled bushing assembly 1 is provided with a bolt hole 5 extending centrally along the axial line X, and the bolt passed through the bolt hole 5 is fastened to the vehicle body, whereby the inboard end of the lower arm 2 is connected to the vehicle body. Various directions mentioned in the following disclosure will be based on the assumption that the liquid filled bushing assembly 1 is provide at the inboard end of the lower arm, but the present invention is not limited by such an embodiment, and the orientation of the axial line X may also be freely selected depending on each particular application.

The liquid filled bushing assembly 1 includes a cylindrical inner tubular member 11, a cylindrical outer tubular member 12 that coaxially surrounds the inner tubular member 11 with a certain annular space defined therebetween, and an elastic member 13 interposed and connected between the inner tubular member 11 and the outer tubular member 12.

The inner tubular member 11 is a metal member, and more specifically a metal member having a low magnetic permeability (for example, aluminum) or the like. In the present embodiment, the inner tubular member 11 extends in the vertical direction along the axial line X, and includes a cylindrical inner tubular main body 15 extending along the axial line X and defining the bolt hole 5, and an inner reinforcing portion 16 made of a bent plate member projecting radially outward from the inner tubular main body 15.

Figure 2:
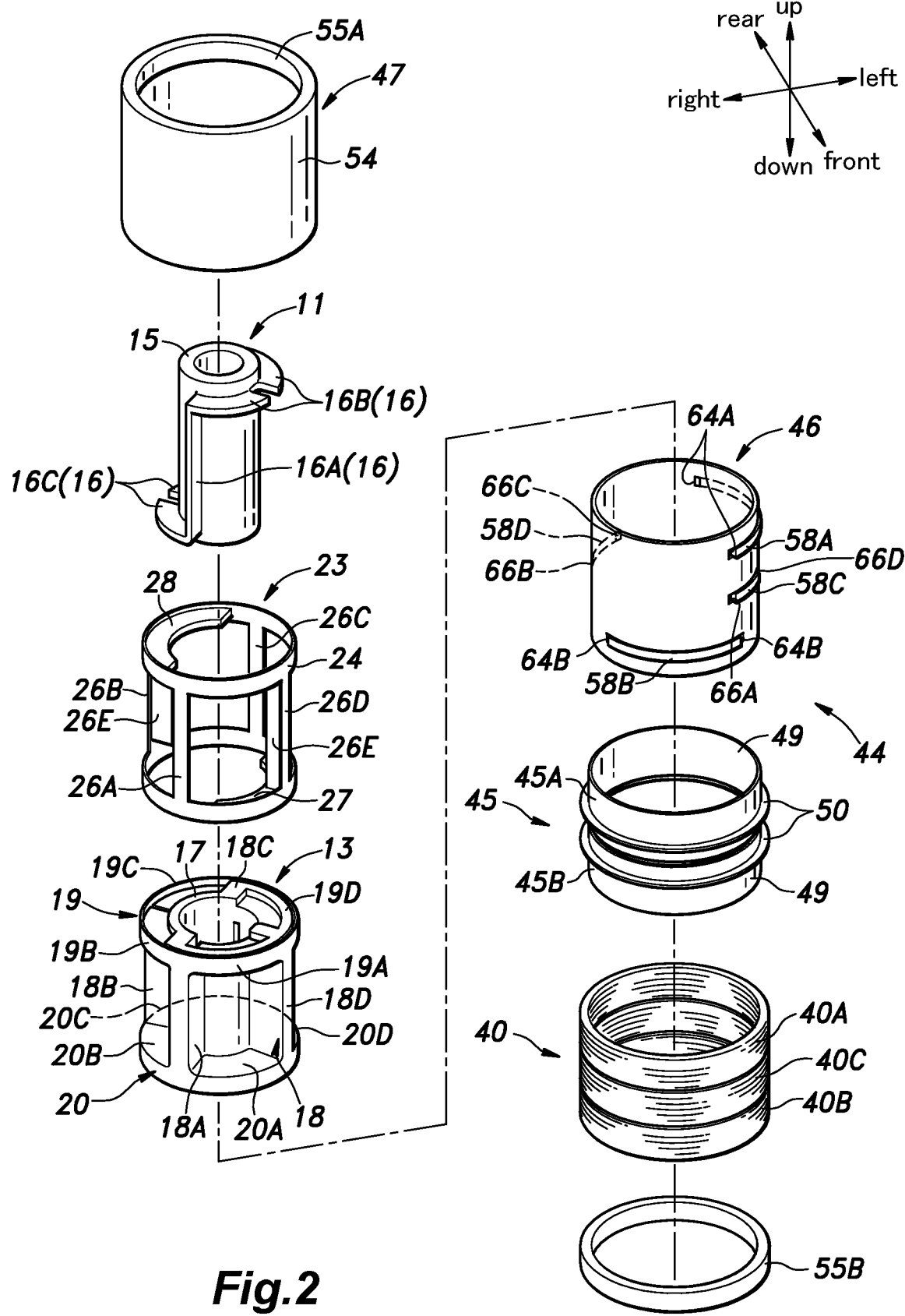
FIG. 2 is an exploded perspective view of the liquid filled bushing assembly.

As shown in FIG. 2, the inner reinforcing portion 16 includes a pair of middle inner reinforcing plates 16A projecting radially outward and extending vertically from an upper part to a lower part of the outer peripheral surface of the inner tubular main body 15 at diametrically opposing positions, a pair of upper inner reinforcing plates 16B projecting radially outward and extending in the circumferential direction, and a pair of lower inner reinforcing plates 16C projecting radially outward and extending in the circumferential direction.

The middle inner reinforcing plates 16A protrude in diametrically opposing directions away from each other about the axial line X. More specifically, one of the middle inner reinforcing plates 16A protrudes in a right and forward direction, and the other middle inner reinforcing plate 16A protrudes in a left and rearward direction.

Each upper inner reinforcing plate 16B faces vertically, and is provided with a sector shape spanning by an angle slightly smaller than 90 degrees in top view, and one of the upper inner reinforcing plates 16B extends in the forward direction while the other upper inner reinforcing plate 16B extends in the leftward direction. The two upper inner reinforcing plate 16B extends at a same elevation, and are circumferentially spaced from each other by a gap or a notch defined therebetween.

The right edge of the upper inner reinforcing plate 16B that protrudes forward may be connected to the upper edge of the middle inner reinforcing plate 16A protruding rightward and forward, and the rear edge of the upper inner reinforcing plate 16B that protrudes leftward may be connected to the upper edge of the middle inner reinforcing plate 16A protruding leftward and rearward.

Each lower inner reinforcing plate 16C faces vertically, and is provided with a sector shape spanning by an angle slightly smaller than 90 degrees in top view, and one of the lower inner reinforcing plates 16C extends in the rearward direction while the other lower inner reinforcing plate 16C extends in the rightward direction. The two lower inner reinforcing plates 16C extend at a same elevation, and are circumferentially spaced from each other by a gap or a notch defined therebetween.

The left edge of the lower inner reinforcing plate 16C extending rearward may be connected to the lower edge of the middle inner reinforcing plate 16A protruding in the left and rearward direction, and the front edge of the lower inner reinforcing plate 16C extending rightward may be connected to the lower edge of the middle inner reinforcing plate 16A protruding in the right and forward direction.

The elastic member 13 is made of an elastic material such as rubber or elastomer. The elastic member 13 includes a cylindrical center body 17 provided around the outer peripheral surface of the inner tubular member 11 in a coaxial relationship, and a first to a fourth radial wall 18 extending radially outward from the outer peripheral surface of the center body 17. The elastic member 13 further includes an upper end wall 19 (first end wall) extending radially outward from the upper end of the center body 17, and a lower end wall 20 (second end wall 20) extending radially outward from the lower end of the center body 17.

Each radial wall 18 extends vertically from the upper end to the lower end of the center body 17, and has a plate shape facing in the circumferential direction. Each radial wall 18 is connected to the inner peripheral surface of the outer tubular member 12 at the radially outer end thereof. The first to fourth radial walls 18 are denoted with suffixes A to D according to the clockwise circumferential order in which these radial walls are arranged in top view. The first radial wall 18 (right front wall 18A) protrudes rightward and forward from the outer peripheral surface of the center body 17, and the second radial wall 18 (right rear wall 18B) protrudes rightward and rearward from the outer peripheral surface of the center body 17. The third radial wall 18 (left rear wall 18C) protrudes leftward and rearward from the outer peripheral surface of the center body 17, and the fourth radial wall 18 (left front wall 18D) protrudes leftward and forward from the outer peripheral surface of the center body 17.

The upper end wall 19 has circular disk shape and faces in the vertical direction. The upper end wall 19 is connected to the outer peripheral surface of the center body 17, the upper edges of the radial walls 18, and the inner peripheral surface of the outer tubular member 12.

More specifically, the upper end wall 19 may be considered as consisting of four sector parts 19A to 19D each spanning by an angle of about 90 degrees, and connected to the upper edges of the corresponding adjoining radial walls 18. More specifically, the front sector part 19A of the upper end wall 19 is connected to the outer peripheral surface of the center body 17, the upper end of the left front wall 18D, the upper end of the right front wall 18A, and the inner peripheral surface of the outer tubular member 12. The right sector part 19B of the upper end wall 19 is connected to the outer peripheral surface of the center body 17, the upper end of the right front wall 18A, the upper end of the right rear wall 18B, and the inner peripheral surface of the outer tubular member 12. The rear sector part 19C of the upper end wall 19 is connected to the outer peripheral surface of the center body 17, the upper end of the right rear wall 18B, the upper end of the left rear wall 18C, and the inner peripheral surface of the outer tubular member 12. The left sector part 19D of the upper end wall 19 is connected to the outer peripheral surface of the center body 17, the upper end of the left rear wall 18C, the upper end of the left front wall 18D, and the inner peripheral surface of the outer tubular member 12.

The lower end wall 20 also has circular disk shape and faces in the vertical direction. The lower end wall 20 is connected to the outer peripheral surface of the center body 17, the lower edges of the radial walls 18, and the inner peripheral surface of the outer tubular member 12.

More specifically, the lower end wall 20 also may be considered as consisting of four sector parts 20A to 20D each spanning by an angle of about 90 degrees, and connected to the lower edges of the corresponding adjoining radial walls 18. The front sector part 20A of the lower end wall 20 is connected to the outer peripheral surface of the center body 17, the lower end of the left front wall 18D, the lower end of the right front wall 18A, and the inner peripheral surface of the outer tubular member 12. The right sector part 20B of the lower end wall 20 is connected to the outer peripheral surface of the center body 17, the lower end of the right front wall 18A, the lower end of the right rear wall 18B, and the inner peripheral surface of the outer tubular member 12. The rear sector part 20C of the lower end wall 20 is connected to the outer peripheral surface of the center body 17, the lower end of the right rear wall 18B, the lower end of the left rear wall 18C, and the inner peripheral surface of the outer tubular member 12. The left sector part 20D of the lower end wall 20 is connected to the outer peripheral surface of the center body 17, the lower end of the left rear wall 18C, the lower end of the left front wall 18D, and the inner peripheral surface of the outer tubular member 12.

Figure 4A:
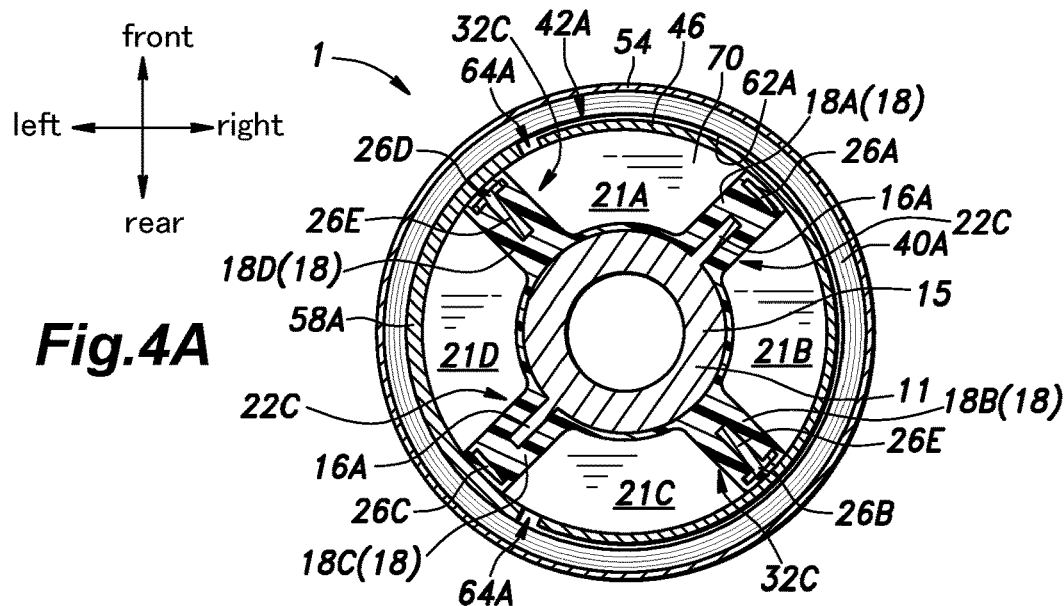
FIG. 4A is a sectional view taken along line IVA-IVA of FIG. 3A.

Thus, as shown in FIG. 4A, the annular space defined by the outer peripheral surface of the center body 17, the inner peripheral surface of the outer tubular member 12, the upper end wall 19, and the lower end wall 20 is divided into four liquid chambers 21. These liquid chambers may be referred to as the first to fourth liquid chambers 21 in the clockwise order in top view. Thus, the four liquid chambers 21 can be arranged in the circumferential direction in a highly simple manner.

More specifically, the first liquid chamber 21A (the front liquid chamber 21A) is defined by the front sector part 19A of the upper end wall 19, the left front wall 18D, the right front wall 18A, the front sector part 20A of the lower end wall 20, and the inner peripheral surface of the outer tubular member 12. The second liquid chamber 21B (the right liquid chamber 21B) is defined by the right sector part 19B of the upper end wall 19, the right front wall 18A, the right rear wall 18B, the right sector part 20B of the lower end wall 20, and the inner peripheral surface of the outer tubular member 12. The third liquid chamber 21C (the rear liquid chamber 21C) is defined by the rear sector part 19C of the upper end wall 19, the right rear wall 18B, the left rear wall 18C, the rear sector part 19C of the lower end wall, and the inner peripheral surface of the outer tubular member 12. The fourth liquid chamber 21D (the left liquid chamber 21D) is defined by the left sector part 19D of the upper end wall 19, the left rear wall 18C, the left front wall 18D, the left sector part 20D of the lower end wall 20, and the inner peripheral surface of the outer tubular member 12.

The front liquid chamber 21A and the rear liquid chamber 21C diametrically oppose each other via the axial line X, and are thus paired in the fore and aft direction. The left liquid chamber 21D and the right liquid chamber 21B diametrically oppose each other via the axial line X, and are thus paired in the lateral direction. When no load is applied to the liquid filled bushing assembly 1, the cubic capacities of the four liquid chambers 21 are substantially equal to one another.

As shown in FIG. 2, the upper inner reinforcing plates 16B abut against the upper side of the front sector part 19A and the left sector part 19D of the upper end wall 19 (first end wall), respectively. The outer diameter of the upper inner reinforcing plates 16B is slightly smaller than the outer diameter of the upper end wall 19 so that the radially inner parts of the front sector part 19A and the left sector part 19D of the upper end wall 19 are reinforced by the upper inner reinforcing plates 16B, respectively. The upper edge of the left front wall 18D snugly fits into the gap or the notch formed between the two upper inner reinforcing plates 16B. Thus, a first inner high bending stiffness portion 22A having a relatively high bending stiffness is provided on the radially inner parts of the front sector part 19A and the left sector part 19D of the upper end wall 19 (see FIG. 3C).

Further, the lower inner reinforcing plates 16C abut against the lower side of the right sector part 20B and the rear sector part 20C of the lower end wall 20 (second end wall), respectively. The outer diameter of the lower inner reinforcing plates 16C is slightly smaller than the outer diameter of the lower end wall 20 so that the radially inner parts of the right sector part 20B and the rear sector part 20C of the lower end wall 20 are reinforced by the lower inner reinforcing plates 16C, respectively. The lower edge of the right rear wall 18B snugly fits into the gap or the notch formed between the two lower inner reinforcing plates 16C. Thus, a second inner high bending stiffness portion 22B having a relatively high bending stiffness is provided on the radially inner parts of the right sector part 20B and the rear sector part 20C of the lower end wall 20 (see FIG. 3C).

As shown in FIGS. 2 and 4A, the middle inner reinforcing plates 16A of the inner tubular member 11 are respectively located at positions corresponding to the right front wall 18A and the left rear wall 18C, and are embedded in the right front wall 18A and the left rear wall 18C. As a result, the radially inner parts of the right front wall 18A and the left rear wall 18C are reinforced by the respective middle inner reinforcing plates 16A so that a third inner high bending stiffness portion 22C having a relatively high bending stiffness is provided in the radially inner parts of the right front wall 18A and the left rear wall 18C.

As shown in FIG. 2, a reinforcing member 23 having the shape of a cylindrical cage is embedded in the elastic member 13 in order to increase the bending stiffness of prescribed parts of the elastic member 13.

The reinforcing member 23 includes an annular upper ring portion 24 provided along and inside the outer peripheral edge of the upper end wall 19, an annular lower ring portion 25 provided along and inside the outer peripheral edge of the lower end wall 20, and four vertical bars 26 (the first to fourth vertical bars 26A to 26D) extending between the upper ring portion 24 and the lower ring portion 25 so as to extends along and inside the radially outer edges of the four radial walls 18, respectively. The vertical bars 26 extend vertically, and are arrange at a regular angular interval along the circumferential direction. The reinforcing member 23 is made of material having a low magnetic permeability such as aluminum.

The lower ring portion 25 is provided with a lower outer reinforcing plate 27 extending radially inward from an outer peripheral part of the lower end wall 20 to a radially intermediate part of the lower end wall 20 over an angular range of about 180 degrees so as to correspond to the front sector part 20A and the left sector part 20D of the lower end wall 20. The lower outer reinforcing plate 27 is formed as a plate member facing in the vertical direction, and is attached to the lower surface of the corresponding part of the lower end wall 20. As a result, the front sector part 20A and the left sector part 20D of the lower end wall 20 that define the bottom ends of the first liquid chamber 21A and the fourth liquid chamber 21D, respectively, are formed as a first outer high bending stiffness portion 32A having a relatively high bending stiffness (see FIG. 3C).

The upper ring portion 24 is provided with an upper outer reinforcing plate 28 extending radially inward from an outer peripheral part of the upper end wall 19 to a radially intermediate part of the upper end wall 19 over an angular range of about 180 degrees so as to correspond to the right sector part 19B and the rear sector part 19C of the upper end wall 19. The upper outer reinforcing plate 28 is formed as a plate member facing in the vertical direction, and is attached to the upper surface of the corresponding part of the upper end wall 19. As a result, the right sector part 19B and the rear sector part 19C of the upper end wall 19 that define the top ends of the second liquid chamber 21B and the third liquid chamber 21C, respectively, are formed as a second outer high bending stiffness portion 32B having a relatively high bending stiffness (see FIG. 3C).

Figure 3A:
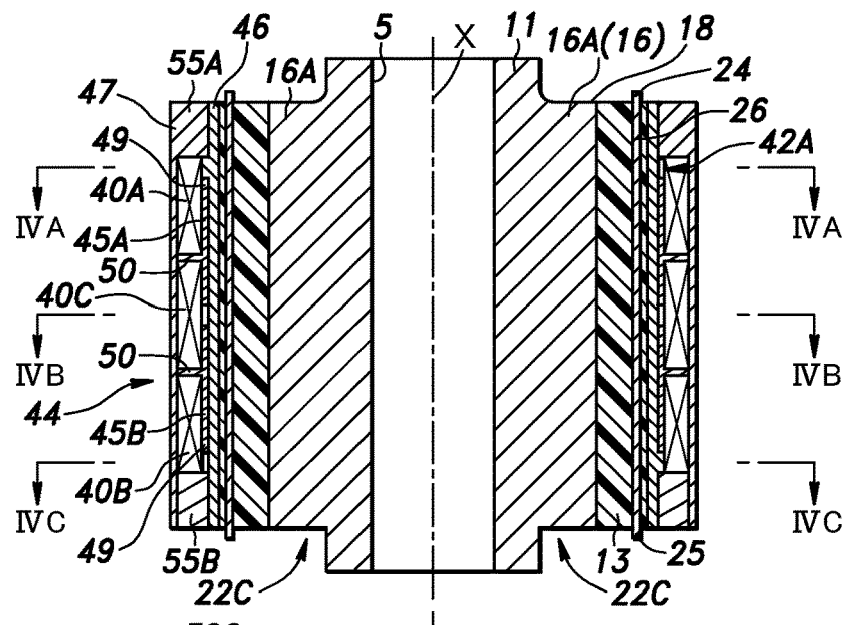
FIG. 3A is a sectional view taken along line IIIA-IIIA of FIG. 1.

As shown in FIG. 3A, the first to fourth vertical bars 26 each pass slightly inside the outer edge of the corresponding radial wall 18, and are embedded in the corresponding radial wall 18. More specifically, the first vertical bar 26 (the right front vertical bar 26A) extends along and inside the radially outer edge of the right front wall 18A. The second vertical bar 26 (the right rear vertical bar 26B) extends along and inside the radially outer edge of the right rear wall 18B. The third vertical bar 26 (the left rear vertical bar 26C) extends along and inside the radially outer edge of the left rear wall 18C. The fourth vertical bar 26 (the left front vertical bar 26D) extends vertically along and inside the radially outer edge of the left front wall 18D.

As shown in FIG. 2, the right rear vertical bar 26B and the left front vertical bar 26D are each provided with a radial reinforcing plate 26E that protrudes radially inward from a vertical middle part thereof toward the central axial line X. Each radial reinforcing plate 26E faces in the circumferential direction, and has a plate shape extending vertically. The radial reinforcing plate 26E provided on the right rear vertical bar 26B is placed inside the right rear wall 18B, and the radial reinforcing plate 26E provided on the left front vertical bar 26D is placed inside the left front wall 18D. As shown in FIG. 4A, the radially inner edge of each radial reinforcing plate 26E reaches a radially substantially middle point in top view. Thus, each radial reinforcing plate 26E is embedded in the corresponding radial wall 18 so that the right rear wall 18B and the left front wall 18D are reinforced by the radial reinforcing plates 26E, respectively. Thus, the right rear wall 18B (second radial wall 18B) and the left front wall 18D (fourth radial wall 18D) are formed as a third outer high bending stiffness portion 32C having a relatively high bending stiffness. As discussed above, the upper ring portion 24, the lower ring portion 25, and the vertical bars 26 are incorporated in the upper end wall 19, the lower end wall 20, and the corresponding radial walls 18, respectively, to locally increase the bending stiffness of the elastic member 13. Thus, the elastic member 13 is locally and strategically reinforced for a favorable functioning thereof as will be discussed hereinafter.

Figure 3B:
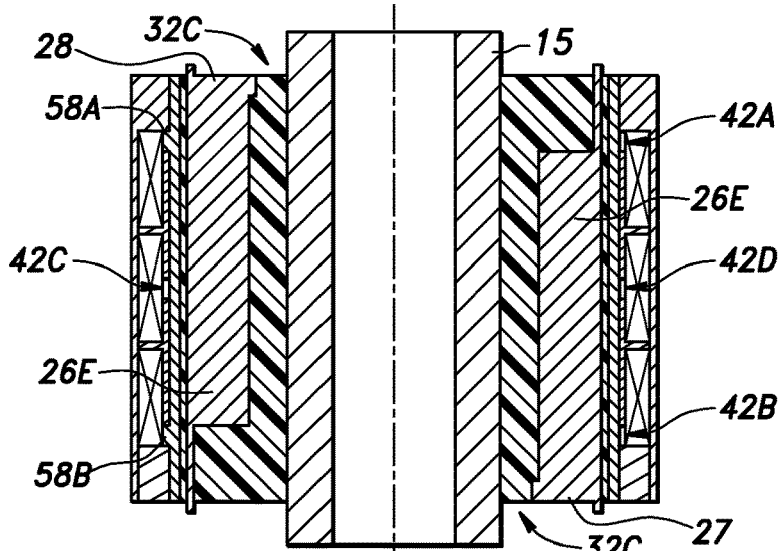
FIG. 3B is a sectional view taken along line IIIB-IIIB of FIG. 1.
Figure 3C:
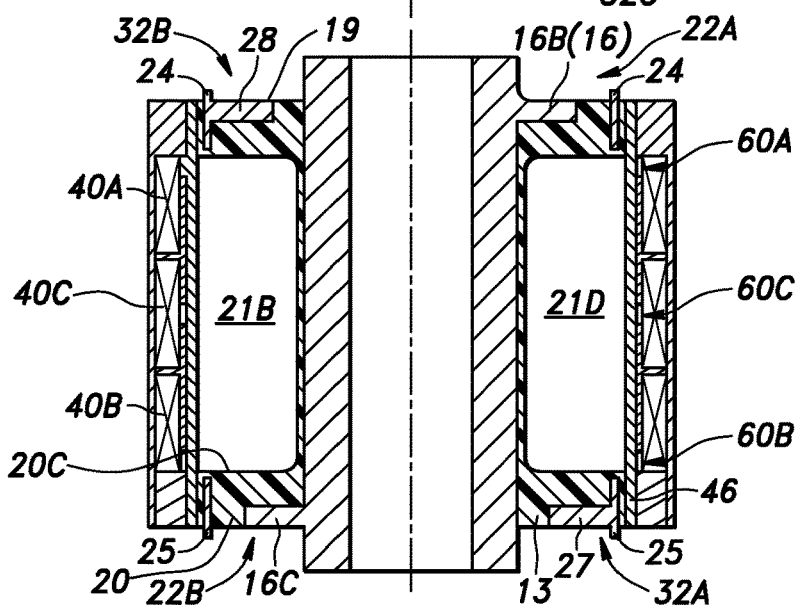
FIG. 3C is a sectional view taken along line IIIC-IIIC of FIG. 1.

As shown in FIGS. 3A to 3C, the outer tubular member 12 includes a coil support member 44 having a substantially cylindrical configuration, and three substantially identical helical coils 40 that are supported by the coil support member 44 so as to be arranged coaxially with the inner tubular member 11 and along the axial line X.

Figure 4B:
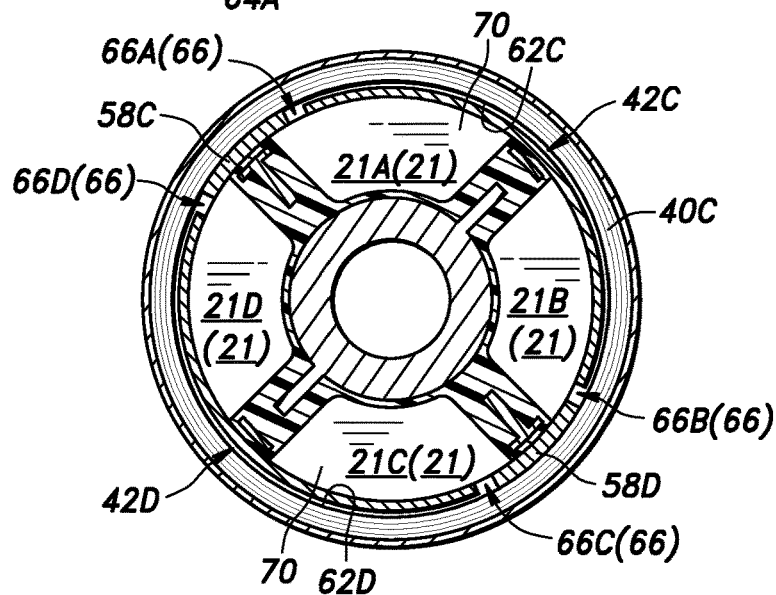
FIG. 4B is a sectional view taken along line IVB-IVB of FIG. 3A.
Figure 4C:
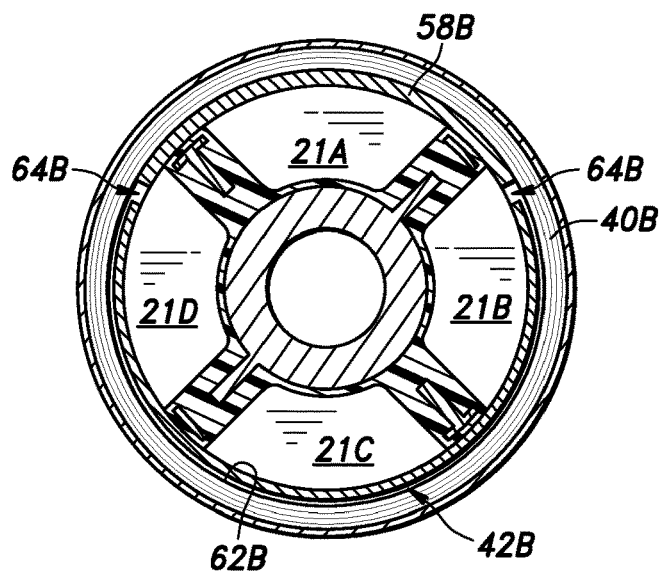
FIG. 4C is a sectional view taken along line IVC-IVC of FIG. 3A.

As shown in FIGS. 4A, 4B, and 4C, the three coils 40 surround the four liquid chambers 21. Hereinafter, the uppermost coil 40 (first coil 40) may be referred to as the upper coil 40A, the lowermost coil 40 (second coil 40) as the lower coil 40B, and the middle coil 40 (third coil 40) as the middle coil 40C.

As shown in FIG. 2, the coil support member 44 includes a pair of inner yokes 45 each having a cylindrical shape, a cylindrical passage forming member 46 fitted into the inner bores of the two inner yokes 45, and an outer yoke 47 that surrounds the passage forming member 46, the inner yokes 45 and the three coils 40 all in a coaxial relationship.

Each inner yoke 45 is a member made of a material having a high magnetic permeability, such as soft iron. Each inner yoke 45 includes a cylindrical tube body 49 and an annular large diameter portion 50 that projects radially outward from an axially intermediate part of the cylindrical tube body 49 and extends circumferentially around the cylindrical tube body 49. The outer diameter of the cylindrical tube body 49 is substantially equal to the inner diameter of the coils 40, and the outer diameter of the annular large diameter portions 50 is substantially equal to the outer diameter of the coils 40. Hereinafter, the upper inner yoke 45 may be referred to as the upper inner yoke 45A, and the lower inner yoke 45 may be referred to as the lower inner yoke 45B.

As shown in FIG. 3A, the cylindrical tube body 49 of the upper inner yoke 45A is inserted into the inner bore of the upper coil 40A at an axially upper part thereof, and into the inner bore of the middle coil 40C at an axially lower part thereof. The cylindrical tube body 49 of the upper inner yoke 45A is in contact with the inner peripheral surface of the upper coil 40A and the middle coil 40C at the outer peripheral surface so that the gap between the outer surface of the upper inner yoke 45A and the inner peripheral surface of the upper coil 40A, and the gap between the outer surface of the upper inner yoke 45A and the inner peripheral surface of the middle coil 40C are closed. The lower end surface of the upper coil 40A and the upper end surface of the middle coil 40C are in contact with the respective annular shoulder surfaces of the annular large diameter portion 50.

The cylindrical tube body 49 of the lower inner yoke 45B is inserted into the inner bore of the middle coil 40C at an axially upper part thereof, and into the inner bore of the lower coil 40B in axially lower part thereof The cylindrical tube body 49 of the lower inner yoke 45B is in contact with the inner peripheral surface of the middle coil 40C and the lower coil 40B at the outer peripheral surface thereof so that the gap between the outer surface of the lower inner yoke 45B and the inner peripheral surface of the middle coil 40C, and the gap between the outer surface of the lower inner yoke 45B and the inner peripheral surface of the lower coil 40B are closed. The lower end surface of the middle coil 40C and the upper end surface of the lower coil 40B are in contact with the respective annular shoulder surfaces of the annular large diameter portion 50.

The lower edge of the upper inner yoke 45A and the upper edge of the lower inner yoke 45B are located inside the inner bore of the middle coil 40C. An annular gap is defined between the lower edge of the upper inner yoke 45A and the upper edge of the lower inner yoke 45B so that the upper inner yoke 45A and the lower inner yoke 45B oppose each other via the annular gap inside the middle coil 40C.

The passage forming member 46 is a metal or other member made of a material having a low magnetic permeability such as aluminum. As shown in FIG. 3A, the passage forming member 46 is vertically passed into the inner bores of the upper inner yoke 45A and the lower inner yoke 45B. The passage forming member 46 and the elastic member 13 have a substantially same axial length, and vertically aligned with each other. The upper end of the passage forming member 46 is slightly higher than the upper end of the upper coil 40A, and the lower end of the passage forming member 46 is slightly lower than the lower end of the lower coil 40B.

The outer yoke 47 is a member made of a material having a high magnetic permeability such as soft iron. As shown in FIG. 2, the outer yoke 47 includes a cylindrical outer yoke tube body 54, an upper annular protruding portion 55A protruding radially inward from the upper end of the inner periphery of the outer yoke tube body 54, and a lower annular protruding portion 55B protruding radially inward from the lower end of the inner periphery of the outer yoke tube body 54. In this embodiment, the upper annular protruding portion 55A is integrally formed with the outer yoke tube body 54 while the lower annular protruding portion 55B consists of a separate ring member which is press fitted into the inner bore of the outer yoke tube body 54. The inner diameter of the outer yoke tube body 54 is substantially equal to the outer diameter of the coils 40, and the axial length of the outer yoke tube body 54 is substantially equal to the axial length of the passage forming member 46. The three coils 40, the inner yokes 45, and the passage forming member 46 are inserted into the inner bore of the outer yoke 47. The upper edge of the outer yoke 47 is located at a same elevation as the upper edge of the passage forming member 46, and the lower edge of the outer yoke 47 is located at a same elevation as the lower edge of the passage forming member 46.

As shown in FIGS. 3A, 3B, and 3C, the upper annular protruding portion 55A has a cylindrical shape that is coaxial with the outer yoke tube body 54. The inner circumferential surface of the upper annular protruding portion 55A abuts against the outer peripheral surface of the upper end of the passage forming member 46, so that the gap between the inner circumferential surface of the upper annular protruding portion 55A and the upper end of the outer peripheral surface of the passage forming member 46 is closed.

The lower surface of the upper annular protruding portion 55A abuts against the upper end surface of the upper coil 40A so that the gap between the lower surface of the upper annular protruding portion 55A and the upper surface of the upper coil 40A is closed. The lower surface of the upper annular protruding portion 55A is vertically spaced from the upper end of the upper inner yoke 45A. As a result, an annular gap is defined by the lower surface of the upper annular protruding portion 55A, the outer peripheral surface of the upper end part of the passage forming member 46, the inner peripheral surface of the upper end part of the upper coil 40A, and the upper end surface of the upper inner yoke 45A. Thus, the lower surface of the upper annular protruding portion 55A opposes the upper end surface of the upper inner yoke 45A via a gap.

The inner circumferential surface of the lower annular protruding portion 55B abuts against the outer peripheral surface of the lower end of the passage forming member 46, so that the gap between the inner circumferential surface of the lower annular protruding portion 55B, and the lower end of the outer peripheral surface of the passage forming member 46 is closed.

As shown in FIG. 4A, the upper surface of the lower annular protruding portion 55B abuts against the lower end surface of the lower coil 40B so that the gap between the upper surface of the lower annular protruding portion 55B and the lower surface of the lower coil 40B is closed. The upper surface of the lower annular protruding portion 55B is vertically spaced from the lower end of the lower inner yoke 45B. As a result, an annular gap is defined by the upper surface of the lower annular protruding portion 55B, the outer peripheral surface of the lower end part of the passage forming member 46, the inner peripheral surface of the lower end part of the lower coil 40B, and the lower end surface of the lower inner yoke 45B. Thus, the upper surface of the lower annular protruding portion 55B opposes the lower end surface of the lower inner yoke 45B via a gap.

In other words, an annular gap is created between the upper annular protruding portion 55A of the outer yoke 47 and the upper end of the upper inner yoke 45A, between the lower end of the upper inner yoke 45A and the upper end of the lower inner yoke 45B, and between the lower annular protruding portion 55B of the outer yoke 47 and the lower end of the lower inner yoke 45B.

As shown in FIG. 2, a first to a fourth rib 58 are formed on the outer peripheral surface of the passage forming member 46 so as to protrude radially outward and extend in the circumferential direction.

As shown in FIG. 4A, the first rib 58A fits into the annular gap (the annular upper gap 60A) between the lower surface of the upper annular protruding portion 55A of the outer yoke 47 and the upper end of the upper inner yoke 45A. The first rib 58A is in contact with the upper surface of the upper annular protruding portion 55A of the outer yoke 47, and with the upper end of the upper inner yoke 45A. The outer circumferential surface of the first rib 58A is in contact with the inner circumferential surface of the upper coil 40A.

The first rib 58A extends circumferentially by an angular range substantially smaller than 180 degrees so as to reach a part of the front liquid chamber 21A and the rear liquid chamber 21C as viewed from above. Thus, an arcuate first circumferential passage 62A is formed so as to extend along the entire circumference of the left liquid chamber 21D and parts of the front liquid chamber 21A and the rear liquid chamber 21C.

One end of the first rib 58A is located in a radially outer part of the front liquid chamber 21A, and the other end of the first rib 58A is located in a radially outer part of the rear liquid chamber 21C. The passage forming member 46 is provided with first openings 64A passed in the radial direction at the parts thereof adjoining the circumferential ends of the first rib 58A, respectively, so that the front liquid chamber 21A communicates with the first circumferential passage 62A via one of the first openings 64A, and the rear liquid chamber 21C communicates with the first circumferential passage 62A via the other first opening 64A. Thus, the outer tubular member 12 is formed with a first communication passage 42 (the fore and aft communication passage 42A) which includes the first openings 64A and the first circumferential passage 62A. In other words, the first communication passage 42 is defined by a part of the annular upper gap 60A spanning an angle substantially greater than 180 degrees so as to communicate the front liquid chamber 21A (first liquid chamber 21A) with the rear liquid chamber 21C (third liquid chamber 21C) along the outer periphery of the right liquid chamber 21B (second liquid chamber 21B)

As shown in FIG. 4C, the second rib 58B fits into the annular gap (the annular lower gap 60B) between the upper surface of the lower annular protruding portion 55B of the outer yoke 47 and the lower end of the lower inner yoke 45B. The second rib 58B is in contact with the upper surface of the lower annular protruding portion 55B of the outer yoke 47, and with the lower end of the lower inner yoke 45B. The outer circumferential surface of the second rib 58B is in contact with the inner circumferential surface of the lower coil 40B.

The second rib 58B extends circumferentially by an angular range substantially smaller than 180 degrees so as to reach a part of the left liquid chamber 21D and the right liquid chamber 21B as viewed from above. Thus, an arcuate second circumferential passage 62B is formed so as to extend along the entire circumference of the front liquid chamber 21A and parts of the left liquid chamber 21D and the right liquid chamber 21B.

One end of the second rib 58B is located in a radially outer part of the right liquid chamber 21B, and the other end of the second rib 58B is located in a radially outer part of the left liquid chamber 21D. The passage forming member 46 is provided with second openings 64B passed in the radial direction at the parts thereof adjoining the circumferential ends of the second rib 58B, respectively, so that the left liquid chamber 21D communicates with the second circumferential passage 62B via one of the second openings 64B, and the right liquid chamber 21B communicates with the second circumferential passage 62B via the other second opening 64B. Thus, the outer tubular member 12 is formed with a second communication passage 42 (the lateral communication passage 42B) which includes the second openings 64B and the second circumferential passage 62B. In other words, the communication passage 42 is defined by a part of the annular lower gap 60B spanning an angle substantially greater than 180 degrees so as to communicate the left liquid chamber 21D (fourth liquid chamber 21D) with the right liquid chamber 21B (second liquid chamber 21B) along the outer periphery of the rear liquid chamber 21C (third liquid chamber 21C)

As shown in FIG. 4B, the third rib 58C and the fourth rib 58D fit into the annular gap (the middle gap 60C) between the lower end of the upper inner yoke 45A and the upper end of the lower inner yoke 45B. The lower surfaces of the third rib 58C and the fourth rib 58D are in contact with the lower end of the upper inner yoke 45A, and the upper surfaces of the third rib 58C and the fourth rib 58D are in contact with the upper end of the lower inner yoke 45B. The third rib 58C abuts against the inner peripheral surface of the middle coil 40C, and the inner peripheral surface of the passage forming member 46 is in contact with the radially outer end of the left front wall 18D so that the part of the middle gap 60C where the third rib 58C is present is closed from the radial and axial directions. The fourth rib 58D abuts against the inner peripheral surface of the middle coil 40C, and the inner peripheral surface of the passage forming member 46 is in contact with the radially outer end of the right rear wall 18B so that the part of the middle gap 60C where the fourth rib 58D is present is closed from the radial and axial directions. Thus, the open part of the lower gap 60B defines a fourth circumferential passage 62D that extends from the radially outer part of the front liquid chamber 21A to the radially outer part of the right liquid chamber 21B, and from the radially outer part of the rear liquid chamber 21C to the radially outer part of the left liquid chamber 21D, the two sections of the fourth circumferential passage 62D each spanning an angle substantially smaller than 90 degrees.

The passage forming member 46 is provided with third openings 66 passed in the radial direction at the parts thereof adjoining the circumferential ends of the third rib 58C (where the third rib 58C is absent), and the parts thereof adjoining the circumferential ends of the fourth rib 58D (where the fourth rib 58D is absent). More specifically, the third openings 66 includes the front third opening 66A that communicates the front liquid chamber 21A with the middle gap 60C, the right third opening 66B that communicates the right liquid chamber 21B with the middle gap 60C, the rear third opening 66C that communicates the rear liquid chamber 21C with the middle gap 60C, and the left third opening 66D that communicates the left liquid chamber 21D with the middle gap 60C.

The front liquid chamber 21A communicates with the third circumferential passage 62C via the front third opening 66A, and the right liquid chamber 21B also communicates with the third circumferential passage 62C via the right third opening 66B. In other words, the outer tubular member 12 is provided with a third communication passage 42 (the front right communication passage 42C) which is jointly formed by the front third opening 66A, the right third opening 66B, and a third circumferential passage 62C so as to communicate the front liquid chamber 21A (first liquid chamber 21) with the right liquid chamber 21B (second liquid chamber 21) via the intermediate gap 60C.

The rear liquid chamber 21C communicates with the fourth circumferential passage 62D via the rear third opening 66C, and the left liquid chamber 21D also communicates with the fourth circumferential passage 62D via the left third opening 66D. In other words, the outer tubular member 12 is provided with a fourth communication passage 42 (the rear left communication passage 42D) which is jointly formed by the rear third opening 66C, the left third opening 66D, and a fourth circumferential passage 62D so as to communicate the rear liquid chamber 21C (third liquid chamber 21) with the left liquid chamber 21D (fourth liquid chamber 21) via the intermediate gap 60C.

In other words, the passage forming member 46 encloses the upper gap 60A, the middle gap 60C, and the lower gap 60B from the radially inner side, and defines the first to the fourth communication passages 42 in cooperation with the inner yokes 45, and the outer yoke 47.

The front liquid chamber 21A, the right liquid chamber 21B, the rear liquid chamber 21C, the left liquid chamber 21D, and the first to fourth communication passages 42 are filled with viscous fluid 70. In the present embodiment, the viscous fluid 70 consists of a magnetic fluid whose viscosity is increased by a magnetic field. A magnetic fluid may be an incompressible fluid containing fine particles of magnetic particles dispersed in a solvent such as oil, and may be referred to as MRF (Magnetorheological Fluid) or MRC (Magnetorheological Compound). When a magnetic field is applied to the magnetic fluid, the fine particles of magnetic material are arranged in chains along the direction of the magnetic field to form chain clusters. As a result, the flow of the solvent in the direction perpendicular to the magnetic field is hindered by the chain clusters so that the viscosity of the magnetic fluid increases, and the magnetic fluid may even become substantially solid.

In this embodiment, the three coils 40 are connected to a voltage source such that the voltage applied to the coils 40 can be varied, and the magnetic fields generated by the coils 40 are directed in the same direction.

The mode of operation and the various features of the liquid filled bushing assembly 1 configured as described above are be discussed in the following.

Figure 5:
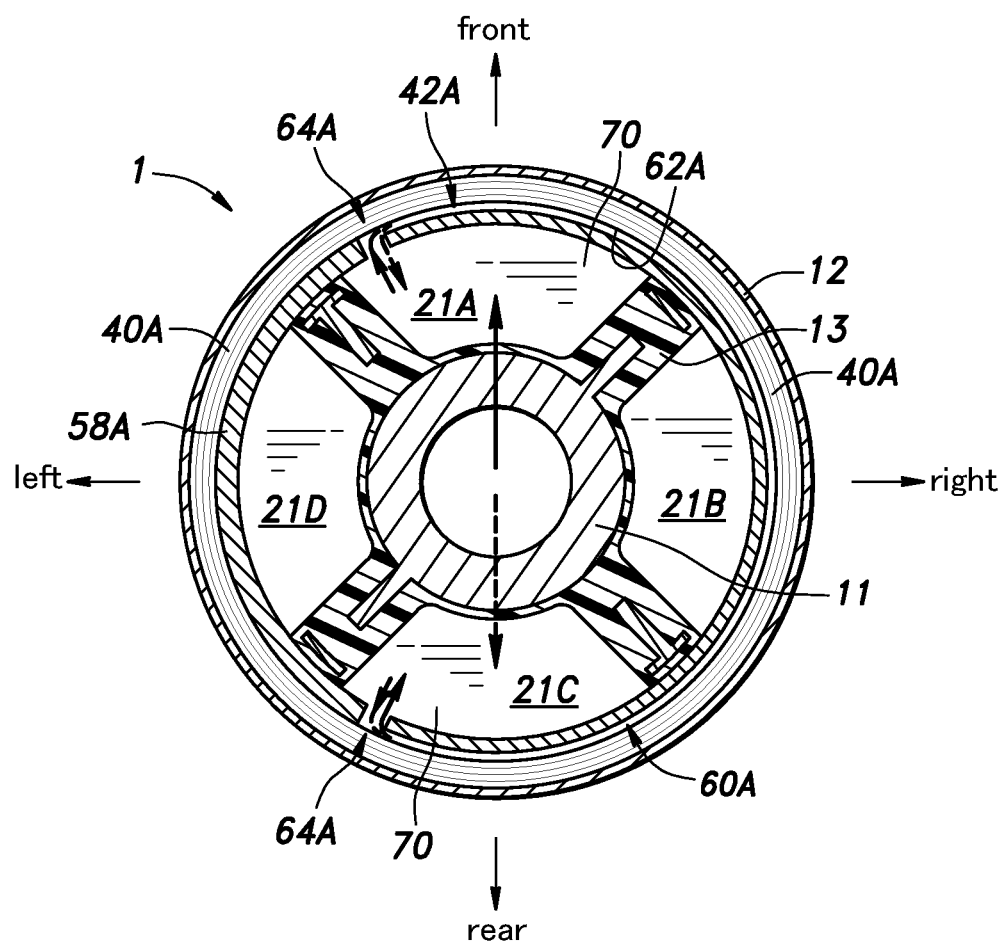
FIG. 5 is a view similar to FIG. 4A showing the movement of the viscous fluid when the inner tubular member is moving in the fore and aft direction relative to the outer tubular member.

As shown in FIG. 5, when a load is applied to the inner tubular member 11 in the fore and aft direction, the cubic capacities of the front liquid chamber 21A and the rear liquid chamber 21C change in a mutually complementary manner (the cubic capacity of one of the liquid chambers 21 increases while the cubic capacity of the other liquid chamber 21 decreases by the corresponding amount). As a result, the viscous fluid 70 moves between the front liquid chamber 21A and the rear liquid chamber 21C via the fore and aft communication passage 42A. As the viscous fluid 70 passes through the fore and aft communication passage 42A, viscous resistance is applied to the viscous fluid 70 so that a resistance force against the fore and aft movement is applied to the inner tubular member 11. By changing the cross sectional area and length of the fore and aft communication passage 42A, the magnitude of the resistance force against the load applied to the inner tubular member 11 in the fore and aft direction, or the stiffness (elastic coefficient) in the fore and aft direction can be changed. In the following disclosure, the stiffness with respect to the load which moves the inner tubular member 11 in the fore and aft direction may be referred to as the stiffness of the liquid filled bushing assembly 1 in the fore and aft direction.

Figure 6:
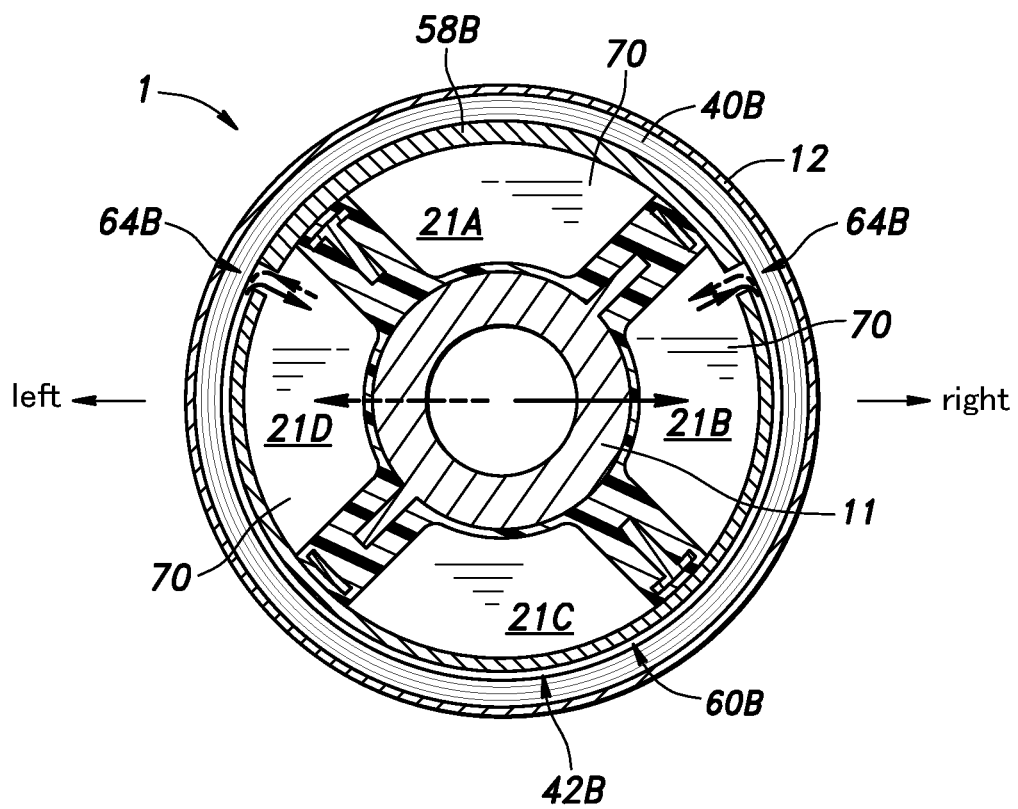
FIG. 6 is a view similar to FIG. 4C showing the movement of the viscous fluid when the inner tubular member is moving in the lateral direction relative to the outer tubular member.

As shown in FIG. 6, when a load is applied to the inner tubular member 11 in the lateral direction, the cubic capacities of the right liquid chamber 21B and the left liquid chamber 21D change in a mutually complementary manner (the cubic capacity of one of the liquid chambers 21 increases while the cubic capacity of the other liquid chamber 21 decreases by the corresponding amount). As a result, the viscous fluid 70 moves between the right liquid chamber 21B and the left liquid chamber 21D via the lateral communication passage 42B. As the viscous fluid 70 passes through the lateral communication passage 42B, viscous resistance is applied to the viscous fluid 70 so that a resistance force against the lateral movement is applied to the inner tubular member 11. By changing the cross sectional area and length of the lateral communication passage 42B, the magnitude of the resistance force against the load applied to the inner tubular member 11 in the lateral direction, or the stiffness (elastic coefficient) in the lateral direction can be changed. In the following disclosure, the stiffness with respect to the load which moves the inner tubular member 11 in the lateral direction may be referred to as the stiffness of the liquid filled bushing assembly 1 in the lateral direction.

As shown in FIG. 7A, since the first inner high bending stiffness portion 22A is provided the radially inner part of the front sector part 19A, when the inner tubular member 11 is moved upward with respect to the outer tubular member 12, the radially outer part of the front sector part 19A is more significantly bent and deformed than the radially inner part thereof, and the radially inner part of the front sector part 19A is moved upward together with the inner tubular member 11 without undergoing any significant deformation. At this time, since the first outer high bending stiffness portion 32A is provided in the radially outer part of the front sector part 20A, the radially inner part the front sector part 20A is more significantly bent and deformed than the radially outer part thereof, and the radially outer part of the front sector part 20A does not undergo any significant deformation or movement. Thus, as a result of the upward movement of the inner tubular member 11, the front sector part 19A and the front sector part 20A are deformed in mutually different manners such that the cubic capacity of the front liquid chamber 21A increases as indicated by the shaded area in FIG. 7A.

As shown in FIG. 7B, since the second outer high bending stiffness portion 32B is provided in the radially outer part of the right sector part 19B, when the inner tubular member 11 is moved upward with respect to the outer tubular member 12, the radially inner part of the right sector part 19B is more significantly bent and deformed than the radially outer part thereof, and the radially outer part of the right sector part 19B does not undergo any significant deformation or movement. At this time, since the second inner high bending stiffness portion 22B is provided in the right sector part 20B, the radially outer part of the right sector part 20B is more significantly bent and deformed than the radially inner part of the right sector part 20B, and the radially inner part of the right sector part 20B moves upward together with the inner tubular member 11 without substantially undergoing any deformation or movement. Thus, as a result of the upward movement of the inner tubular member 11, the right sector part 19B and the right sector part 20B are deformed in different manners such that the cubic capacity of the right liquid chamber 21B decreases as indicated by the shaded area in FIG. 7B.

When the inner tubular member 11 is moved downward relative to the outer tubular member 12, owing to the presence of the first inner high bending stiffness portion 22A and the first outer high bending stiffness portion 32A, the cubic capacity of the front liquid chamber 21A decreases as shown in FIG. 7C. When the inner tubular member 11 is moved downward relative to the outer tubular member 12, owing to the presence of the second inner high bending stiffness portion 22B and the second outer high bending stiffness portion 32B, and the cubic capacity of the right liquid chamber 21B increases as shown in FIG. 7D. In other words, as the inner tubular member 11 moves vertically (along the axial line X) relative to the outer tubular member 12, the cubic capacities of the front liquid chamber 21A (first liquid chamber 21) and the right liquid chamber 21B (second liquid) change in a mutually complementary manner.

Similarly, when the inner tubular member 11 is moved upward relative to the outer tubular member 12, the cubic capacity of the left liquid chamber 21D increases and the cubic capacity of the rear liquid chamber 21C decreases. When the inner tubular member 11 is moved downward with respect to the outer tubular member 12, the cubic capacity of the left liquid chamber 21D decreases and the cubic capacity of the rear liquid chamber 21C increases. Thus, as the inner tubular member 11 moves vertically relative to the outer tubular member 12, the cubic capacities of the rear liquid chamber 21C (third liquid chamber 21) and the left liquid chamber 21D (fourth liquid chamber 21) also change in a mutually complementary manner.

As a result, when a load is applied to the inner tubular member 11 in the vertical direction, and the inner tubular member 11 moves vertically relative to the outer tubular member 12, the viscous fluid 70 flows between the front liquid chamber 21A and the right liquid chamber 21B via the front right communication passage 42C, and between the rear liquid chamber 21C and the left liquid chamber 21D via the rear left communication passage 42D. Since viscous resistance is applied to the viscous fluid 70 when flowing through the communication passages 42, a resistance force against the load in the vertical direction is applied to the inner tubular member 11 so that a damping action is applied to the movement of the inner tubular member 11. By changing the cross sectional area and length of the front right communication passage 42C and the cross sectional area and length of the rear left communication passage 42D, the magnitude of the resistance force against the vertical load applied to the inner tubular member 11, and hence the stiffness (elastic coefficient) of the liquid filled bushing assembly 1 against the vertical movement can be changed. The stiffness with respect to the vertical load applied to the inner tubular member 11 may be referred to as the stiffness of the liquid filled bushing assembly 1 in the vertical direction in the following disclosure.

Figure 8A:
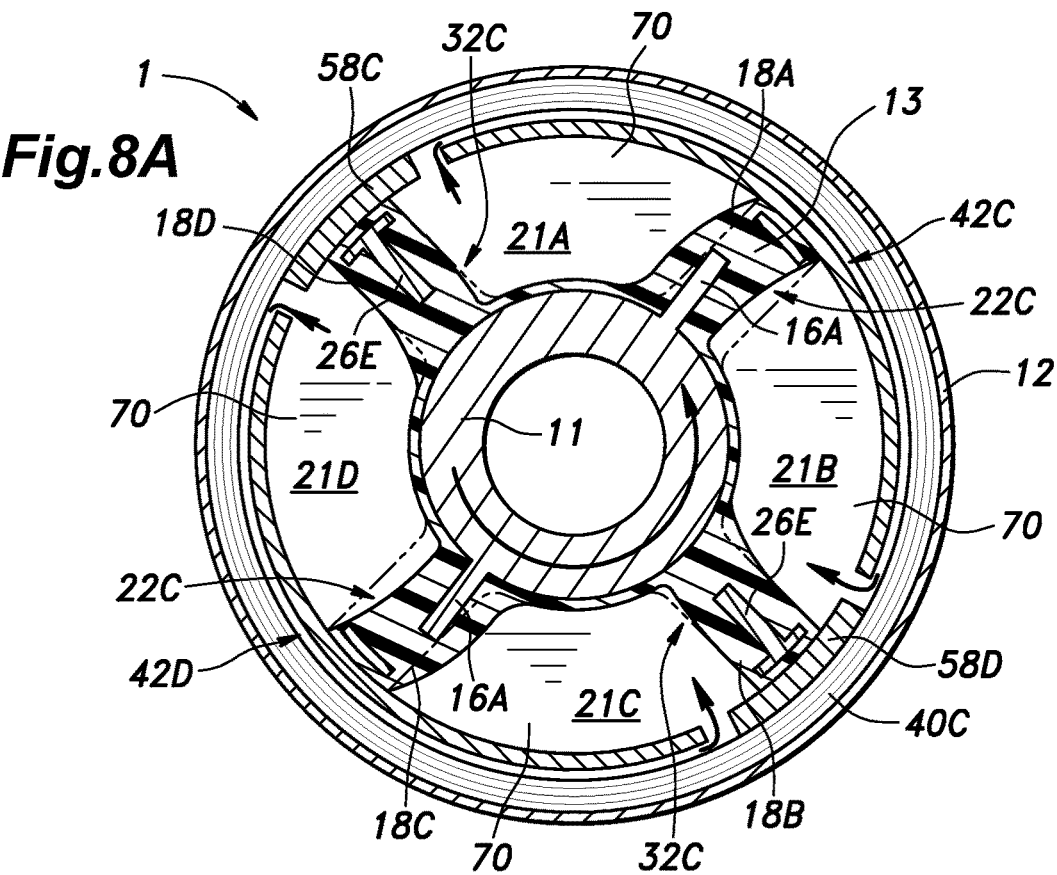
FIG. 8A is a view similar to FIG. 4B when the inner tubular member is turning counterclockwise relative to the outer tubular member in top view.

As shown in FIG. 8A, when the inner tubular member 11 rotates counterclockwise with respect to the outer tubular member 12 around the axial line X in top view, the left front wall 18D and the right rear wall 18B each undergo a relatively large deformation in the radially inner part thereof as compared to the radially outer part thereof owing to the presence of the third outer high bending stiffness portion 32C. At the same time, the right front wall 18A and the left rear wall 18C each undergo a relatively large deformation in the radially outer part thereof as compared to the radially inner part thereof, and the right front wall 18A and the left rear wall 18C move toward the front liquid chamber 21A and the rear liquid chamber 21C, respectively, as the inner tubular member 11 rotates. Thus, as the inner tubular member 11 rotates in counterclockwise direction, the radial walls 18 that separate the liquid chambers 21 from one another along the circumferential direction deform in such a manner that the cubic capacity of the front liquid chamber 21A decreases, the cubic capacity of the right liquid chamber 21B increases, the cubic capacity of the rear liquid chamber 21C decreases, and the cubic capacity of the left liquid chamber 21D increases.

Figure 8B:
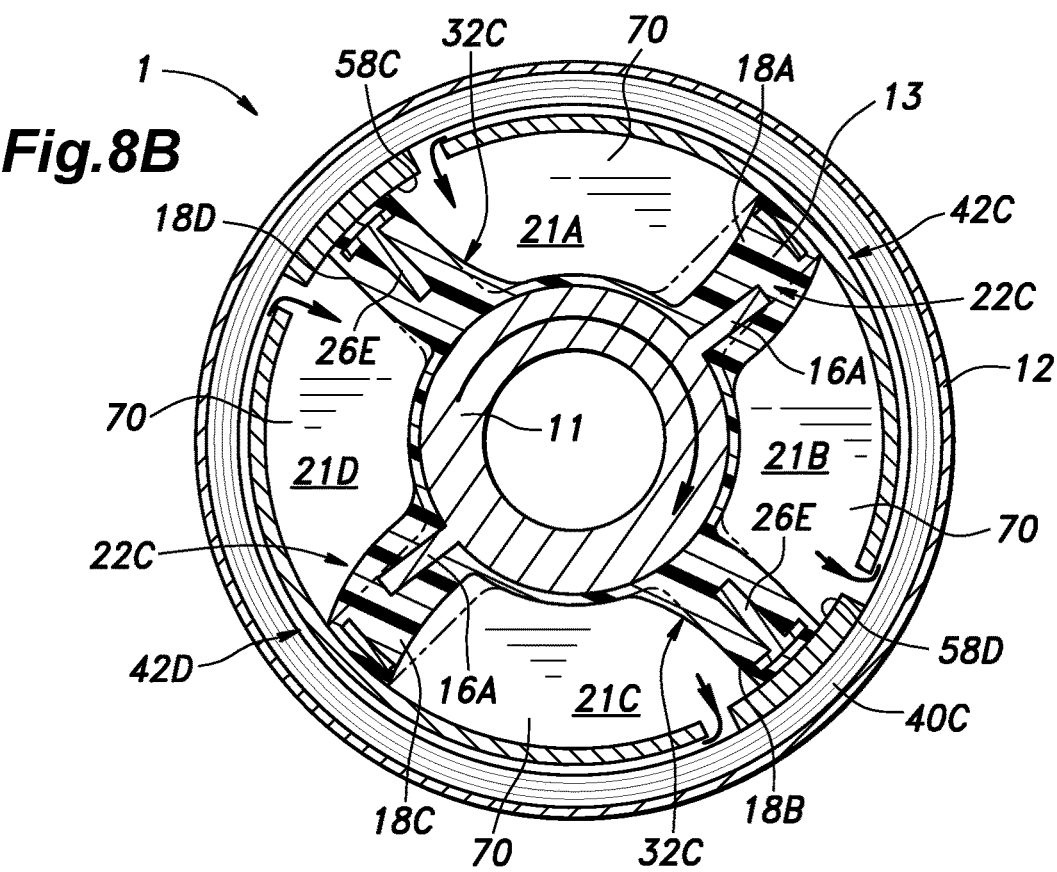
FIG. 8B is a view similar to FIG. 4B when the inner tubular member is turning clockwise relative to the outer tubular member in top view.

As shown in FIG. 8B, when the inner tubular member 11 rotates clockwise with respect to the outer tubular member 12 around the axial line X in top view, the cubic capacity of the front liquid chamber 21A increases, the cubic capacity of the right liquid chamber 21B decreases, the cubic capacity of the rear liquid chamber 21C increases, and the cubic capacity of the left liquid chamber 21D decreases. Thus, when the inner tubular member 11 rotates in either direction with respect to the outer tubular member 12, the cubic capacities of the front liquid chamber 21A (the first liquid chamber 21) and the right liquid chamber 21B (the second liquid chamber 21) change in a mutually complementary manner, and the cubic capacities of the rear liquid chamber 21C (the third liquid chamber 21) and the left liquid chamber 21D (the fourth liquid chamber 21) change in a mutually complementary manner Thus, when the load which causes a rotation around the axial line X is applied to the inner tubular member 11, and the inner tubular member 11 rotates relative to the outer tubular member 12, the cubic capacities of the two of the liquid chambers 21 along a diametrical line via the axial line X increase while the cubic capacities of the remaining liquid chambers 21 decrease. More specifically, the cubic capacities of the front liquid chamber 21A and the right liquid chamber 21B change in a mutually complementary relationship (such that the cubic capacity of the right liquid chamber 21B decreases while the cubic capacity of the front liquid chamber 21A increases by the corresponding amount), and the cubic capacities of the rear liquid chamber 21C and the left liquid chamber 21D change in a mutually complementary relationship. As a result, the viscous fluid 70 moves between the front liquid chamber 21A and the right liquid chamber 21B via the front right communication passage 42C, and between the rear liquid chamber 21C and the left liquid chamber 21D via the rear left communication passage 42D so that a damping action is applied to the movement of the inner tubular member 11. By changing the cross sectional area and length of the front right communication passage 42C and the cross sectional area and length of the rear left communication passage 42D, the magnitude of the resistance force against the load that rotates the inner tubular member 11, or the stiffness against rotation (torsional stiffness) can be changed. In the following disclosure, the stiffness with respect to the load which rotates the inner tubular member 11 may be referred to as the torsional stiffness of the liquid filled bushing assembly 1.

In this way, by changing the cross sectional areas and lengths of the fore and aft communication passage 42A, the lateral communication passages 42B, the front right communication passage 42C, and the rear left communication passage 42D, the stiffness of the liquid filled bushing assembly 1 in the fore and aft direction, the stiffness in the lateral direction, the stiffness in the vertical direction, and the stiffness in the rotational direction, respectively, can be changed as desired.

Thereby, the transmission of sound and vibration to the cabin can be prevented by attenuating prescribed vibration modes, and the stiffness of the liquid filled bushing assembly 1 in a desired direction can be increased so as to improve the handling of the vehicle.

Figure 9:
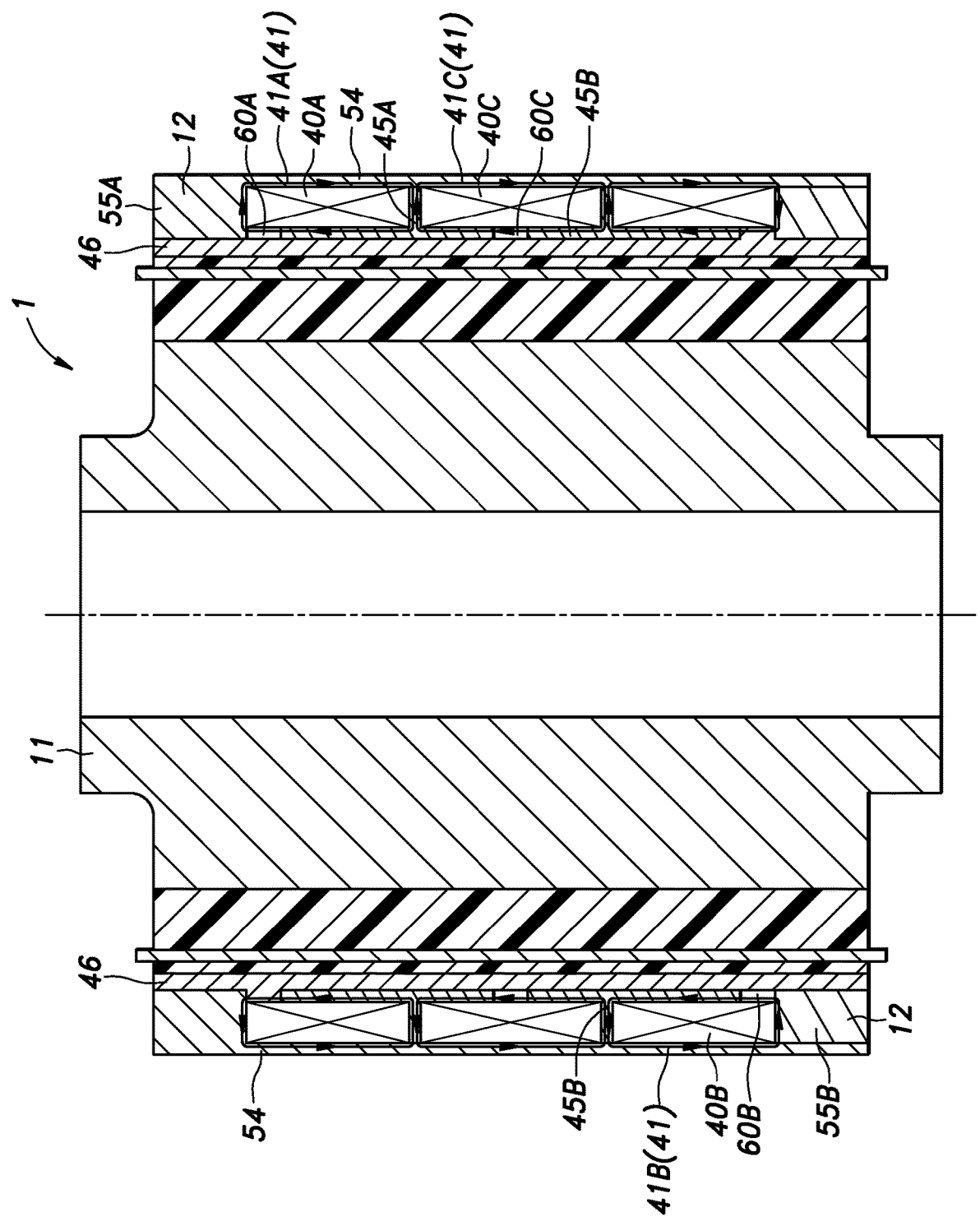
FIG. 9 is a vertical sectional view showing the magnetic fields that are generated by the coils when electric current is supplied to the coils.
Figure 10:
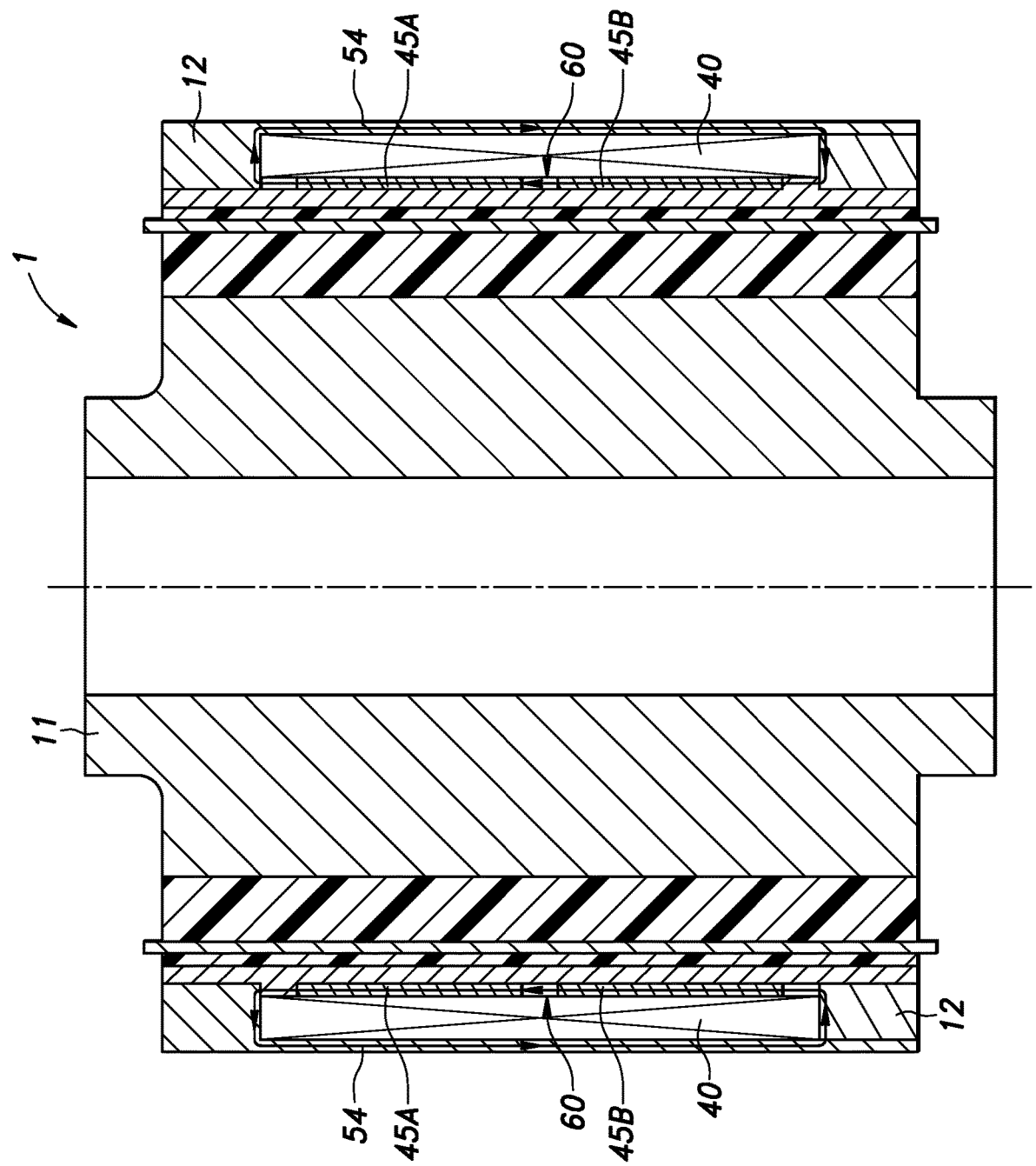
FIG. 10 is a view similar to FIG. 9 showing a modified embodiment of the present invention.

The magnetic circuits 41 formed by the upper coil 40A, the lower coil 40B, and the middle coil 40C, respectively, produce the corresponding magnetic fields as shown in FIG. 9.

More specifically, the magnetic circuit 41A corresponding to the upper coil 40A produces a magnetic flux that forms a loop, and passes through the upper annular protruding portion 55A, the outer yoke tube body 54, the annular large diameter portion 50 of the upper inner yoke 45A, and the upper part of the upper inner yoke 45A. The magnetic flux generated by the upper coil 40A generally passes through the upper gap 60A between the upper annular protruding portion 55A and the upper end of the upper inner yoke 45A. Therefore, the magnetic circuit 41A corresponding to the upper coil 40A performs the function of concentrating the magnetic field generated by the upper coil 40A in the upper gap 60A (first gap) so that the magnetic field corresponding to the upper coil 40A is applied to the first circumferential passage 62A which passes through the upper gap 60A.

When the magnetic field is applied to the first circumferential passage 62A, the viscosity of the viscous fluid 70 passing through the first circumferential passage 62A increases so that the flow of the viscous fluid 70 between the front liquid chamber 21A and the rear liquid chamber 21C is impeded. As a result, the stiffness of the liquid filled bushing assembly 1 in the fore and aft direction is increased.

The magnetic circuit 41B corresponding to the lower coil 40B produces a magnetic flux that forms a loop, and passes through the lower annular protruding portion 55B, the outer yoke tube body 54, the annular large diameter portion 50 of the lower inner yoke 45B, and the lower part of the lower inner yoke 45B. The magnetic flux generated by the lower coil 40B generally passes through the lower gap 60B between the lower annular protruding portion 55B and the lower end of the lower inner yoke 45B. Therefore, the magnetic circuit 41B corresponding to the lower coil 40B performs the function of concentrating the magnetic field generated by the lower coil 40B in the lower gap 60B (second gap) so that the magnetic field corresponding to the lower coil 40B is applied to the second circumferential passage 62B which passes through the lower gap 60B.

When the magnetic field is applied to the second circumferential passage 62B, the viscosity of the viscous fluid 70 passing through the second circumferential passage 62B increases so that the flow of the viscous fluid 70 between the right liquid chamber 21B and the left liquid chamber 21D is impeded. As a result, the stiffness of the liquid filled bushing assembly 1 in the lateral direction is increased.

The magnetic circuit 41C corresponding to the middle coil 40C produces a magnetic flux that forms a loop, and passes through the lower part of the upper inner yoke 45A, the annular large diameter portion 50 of the upper inner yoke 45A, the outer yoke tube body 54, the annular large diameter portion 50 of the lower inner yoke 45B, and the upper part of the lower inner yoke 45B. The magnetic flux generated by the middle coil 40C generally passes through the middle gap 60C between lower end of the upper inner yoke 45A and the upper end of the lower inner yoke 45B. Therefore, the magnetic circuit 41C corresponding to the middle coil 40C performs the function of concentrating the magnetic field generated by the middle coil 40C in the middle gap 60C (third gap) so that the magnetic field corresponding to the middle coil 40C is applied to the third circumferential passage 62C which passes through the middle gap 60C.

When the magnetic field is applied to the third circumferential passage 62C and the fourth circumferential passage 62D, the viscosity of the viscous fluid 70 flowing through the communication passages 42 that passes through the third circumferential passage 62C and the fourth circumferential passage 62D, or in other words, the front right communication passage 42C and the rear left communication passage 42D increases. Accordingly, the movement of the viscous fluid 70 between the front liquid chamber 21A and the right liquid chamber 21B and the movement of the viscous fluid 70 between the rear liquid chamber 21C and the left liquid chamber 21D are respectively impeded. Thereby, the stiffness in the vertical direction and the stiffness in the rotational direction of the inner tubular member 11 are increased.

Therefore, the stiffness in the fore and aft direction of the liquid filled bushing assembly 1 can be changed by changing the current flowing through the upper coil 40A, and the stiffness in the lateral direction of the liquid filled bushing assembly 1 can be changed by changing the current flowing through the lower coil 40B. By changing the current flowing through the middle coil 40C, the vertical stiffness and torsional stiffness of the liquid filled bushing assembly 1 can be both changed. In this way, by increasing the magnitude of the current according to the steering angle, for example, the stiffness of the liquid filled bushing assembly 1 can be increased and the handling performance can be improved. In addition, when traveling on an expressway or the like, the riding comfort can be improved by reducing the stiffness of the liquid filled bushing assembly 1 so that the noise and vibration transmitted to the vehicle cabin can be reduced. Further, by using a material having a low magnetic permeability for the passage forming member 46, the communication passages 42 can be formed without disturbing the magnetic circuits 41.

The present invention has been described in terms of a specific embodiment, but is not limited by such an embodiment, and can be modified in various ways without departing from the scope of the present invention. For instance, the liquid filled bushing assembly 1 of the present embodiment was provided with three coils 40, but may also be provided with a single coil 40 in the part occupied by the upper coil 40A, the middle coil 40C, and the lower coil 40B of the preceding embodiment while omitting the annular large diameter portions 50 of the upper inner yoke 45A and the lower inner yoke 45B. In this case, the stiffness of the liquid filled bushing assembly 1 in the fore and aft direction, the lateral direction, the vertical direction, and the rotational direction changes at the same time depending on the intensity of the electric current supplied to the coil 40.

In the above embodiment, the upper inner yoke 45A and the lower inner yoke 45B were described as consisting of different parts of a single piece member, but they may also consist of a plurality of pieces so that the assembling of the upper inner yoke 45A and the lower inner yoke 45B to the passage forming member 46 may be facilitated. Further, in regard to the outer yoke 47, the outer yoke tube body 54 and the upper annular protruding portion 55A may consist of two separate members that are joined to each other by press fitting, welding or any other means.

In the above described embodiment, the liquid filled bushing assembly 1 was provided with the coils 40, and the magnetic fluid was used as the viscous fluid 70 to allow the stiffness thereof to be variable, but according to a broad concept of the present invention, the viscous fluid 70 may not be a magnetic fluid when the stiffness thereof is not required to variable.

The present invention was applied to an automobile or any other road vehicle, but may also be applied to railway cars and aircraft. The various components of the embodiment are not entirely essential for the present invention, and can be suitably omitted and modified without departing from the scope of the present invention.

The invention claimed is:

1. A liquid filled bushing assembly, comprising:
an inner tubular member having a central axial line;
an outer tubular member surrounding the inner tubular member in a coaxial relationship with an annular space defined therebetween; and
a tubular elastic member interposed and connected between the inner tubular member and the outer tubular member and defining a first to a fourth liquid chamber arranged in a circumferential direction at a regular interval in that order,
the tubular elastic member defining a first communication passage communicating the first liquid chamber with the third liquid chamber, a second communication passage communicating the second liquid chamber with the fourth liquid chamber, a third communication passage communicating the first liquid chamber with the second liquid chamber, and a fourth communication passage communicating the third liquid chamber with the fourth liquid chamber;
wherein the first liquid chamber, the second liquid chamber, the third liquid chamber, the fourth liquid chamber, the first communication passage, the second communication passage, the third communication passage, and the fourth communication passage are filled with viscous fluid,
wherein the liquid chambers are configured such that cubic capacities of the first and second liquid chambers change in a mutually complementary manner, and cubic capacities of the third and fourth liquid chambers change in a mutually complementary manner when the inner tubular member is moved relative to the outer tubular member along the central axial line,
the cubic capacities of the first and second liquid chambers change in a mutually complementary manner, and the cubic capacities of the third and fourth liquid chambers change in a mutually complementary manner when the inner tubular member is rotated relative to the outer tubular member around the central axial line,
the cubic capacities of the first and third liquid chambers change in a mutually complementary manner when the inner tubular member is moved relative to the outer tubular member in a first direction along which the first and third liquid chambers are arranged, and
the cubic capacities of the second and fourth liquid chambers change in a mutually complementary manner when the inner tubular member is moved relative to the outer tubular member in a second direction along which the second and fourth liquid chambers are arranged,
wherein the outer tubular member includes a coil disposed in a coaxial relationship to the inner tubular member, and a yoke having an axial gap located inside the coil, and the viscous fluid consists of a magnetic fluid having a viscosity that increases when subjected to a magnetic field, at least one of the communication passages extending through the axial gap,
wherein the coil includes a first coil, a second coil and a third coil that are arranged along the central axial line in a mutually spaced apart relationship, and the yoke defines first to third axial gaps serving as magnetic gaps corresponding to the first to third coils, respectively,
wherein the first communication passage passes through the first axial gap, the second communication passage passes through the second axial gap, and the third communication passage passes through the third axial gap,
wherein magnetic circuits formed by the first coil, the second coil, and the third coil, respectively, produce corresponding magnetic fields,
wherein the magnetic circuit corresponding to the first coil performs a function of concentrating the magnetic field generated by the first coil in the first axial gap so that the magnetic field corresponding to the first coil is applied to a first circumferential passage which passes through the first axial gap and that a stiffness of the liquid filled bushing assembly in the first direction is increased when the magnetic field is applied to the first circumferential passage,
wherein the magnetic circuit corresponding to the second coil performs a function of concentrating the magnetic field generated by the second coil in the second axial gap so that the magnetic field corresponding to the second coil is applied to a second circumferential passage which passes through the second axial gap and that a stiffness of the liquid filled bushing assembly in the second direction is increased, and
wherein the magnetic circuit corresponding to the third coil performs a function of concentrating the magnetic field generated by the third coil in the third axial gap so that the magnetic field corresponding to the third coil is applied to a third circumferential passage which passes through the third axial gap and that a stiffness in a vertical direction and a stiffness in a rotational direction of the liquid filled bushing assembly are increased.

2. The liquid filled bushing assembly according to claim 1, wherein the tubular elastic member is provided with a first to a fourth radial wall extending in a radial direction with respect to the central axial line and arranged around the central axial line in that order, four first end wall parts attached to corresponding first axial ends of the radial walls, and four second end wall parts attached to corresponding second axial ends of the radial walls in such a manner that the first to fourth liquid chambers are defined by the first to fourth radial walls, the four first end wall parts and the four second end wall parts.

3. The liquid filled bushing assembly according to claim 2, wherein a high bending stiffness portion having a relatively high bending stiffness is provided in radially inner parts of the first end wall part defining a first axial end of the first liquid chamber and the second end wall part defining a second axial end of the second liquid chamber, and another high bending stiffness portion having a relatively high bending stiffness is provided in radially outer parts of the second end wall part defining a second axial end of the first liquid chamber and the first end wall part defining a first axial end of the second liquid chamber.

4. The liquid filled bushing assembly according to claim 3, wherein the high bending stiffness portions include a reinforcing plate provided in each of the corresponding end wall parts.

5. The liquid filled bushing assembly according to claim 2, wherein a high bending stiffness portion having a relatively high bending stiffness is provided in radially inner parts of the first radial wall and the third radial wall, and another high bending stiffness portion having a relatively high bending stiffness is provided in radially outer parts of the second radial wall and the fourth radial wall.

6. The liquid filled bushing assembly according to claim 5, wherein the high bending stiffness portions include a reinforcing plate provided in each of the corresponding radial walls.

7. The liquid filled bushing assembly according to claim 1, wherein the outer tubular member further includes a passage forming member made of material having a low magnetic permeability and enclosing the axial gap from a radially inner side thereof so as to define the at least one of the communication passages extending through the axial gap in cooperation with the coil and the yoke.

* * * * *